United States Patent
Shibuya et al.

(10) Patent No.: US 10,747,177 B2
(45) Date of Patent: Aug. 18, 2020

(54) MECHANICAL COMPONENT, TIMEPIECE, AND MANUFACTURING METHOD OF MECHANICAL COMPONENT

(71) Applicant: Seiko Epson Corporation, Tokyo (JP)

(72) Inventors: Munehiro Shibuya, Minamiminowa (JP); Takeo Funakawa, Chino (JP)

(73) Assignee: Seiko Epson Corporation (JP)

( * ) Notice: Subject to any disclaimer, the term of this patent is extended or adjusted under 35 U.S.C. 154(b) by 170 days.

(21) Appl. No.: 16/001,231

(22) Filed: Jun. 6, 2018

(65) Prior Publication Data

US 2018/0356768 A1    Dec. 13, 2018

(30) Foreign Application Priority Data

Jun. 7, 2017    (JP) ................. 2017-112337

(51) Int. Cl.
| | | |
|---|---|---|
| G04B 1/16 | (2006.01) | |
| G04B 15/14 | (2006.01) | |
| G04B 13/02 | (2006.01) | |
| F16D 1/116 | (2006.01) | |
| F16D 1/10 | (2006.01) | |

(52) U.S. Cl.
CPC ............... *G04B 1/16* (2013.01); *F16D 1/116* (2013.01); *G04B 13/022* (2013.01); *G04B 13/025* (2013.01); *G04B 15/14* (2013.01); *F16D 2001/103* (2013.01); *F16D 2250/0084* (2013.01)

(58) Field of Classification Search
CPC ...... G04B 1/16; G04B 13/022; G04B 13/025; G04B 15/14; G04B 13/026; G04B 13/02; G04B 13/021; G04B 13/012; F16D 1/116; F16D 2001/103; F16D 2250/0084

USPC .................................................. 368/324, 322
See application file for complete search history.

(56) References Cited

U.S. PATENT DOCUMENTS

| | | | | |
|---|---|---|---|---|
| 8,944,676 B2* | 2/2015 | Conus | ................. | G04B 13/022 368/324 |
| 9,457,536 B2* | 10/2016 | Conus | ................. | G04B 13/022 |
| 9,753,433 B2* | 9/2017 | Tanabe | ................. | G04B 13/021 |
| 2011/0205856 A1* | 8/2011 | Zaugg | ................. | G04B 13/025 368/185 |

FOREIGN PATENT DOCUMENTS

| | | |
|---|---|---|
| CH | 709792 A2 | 12/2015 |
| EP | S62-168486 U | 10/1987 |
| JP | 2012-167808 A | 9/2012 |
| WO | WO-2016-143612 A1 | 9/2016 |

OTHER PUBLICATIONS

Extended European Search Report for Application No. EP 18 17 6269 dated Jan. 3, 2019 (8 pages).

\* cited by examiner

*Primary Examiner* — Edwin A. Leon
(74) *Attorney, Agent, or Firm* — Harness, Dickey & Pierce, P.L.C.

(57) ABSTRACT

An escape wheel & pinion serving as a mechanical component includes an axle and an escape wheel serving as a rotary member having a holder for holding the axle. The axle has a recessed portion into which the holder is fitted. A tapered portion inclined in an axial direction of the axle is disposed in a portion where the recessed portion is in contact with the holder.

17 Claims, 13 Drawing Sheets

MECHANICAL COMPONENT, TIMEPIECE, AND MANUFACTURING METHOD OF MECHANICAL COMPONENT

BACKGROUND

1. Technical Field

The present invention relates to a mechanical component, a timepiece, and a manufacturing method of a mechanical component.

2. Related Art

A mechanical timepiece is equipped with numerous mechanical components represented by wheels. The mechanical component such as the wheel is fixed (held) by inserting an axle member into a through-hole (holder) disposed at the center of a rotary member whose outer periphery has a plurality of teeth. In the related art, the mechanical component is formed by carrying out machine work for a metal material. However, in recent years, a base material containing silicon has been used as a material of the mechanical component for a timepiece. The mechanical component made of the silicon serving as the base material is lighter in weight than the mechanical component made of metal serving as the base material. Thus, an inertial force of the mechanical component can be reduced. Accordingly, improved efficiency in transferring energy is expected. The silicon allows various shapes to be freely formed using a photolithography and etching technique. Therefore, there is an advantage in that processing accuracy of the mechanical component can be improved by using the silicon as the base material.

JP-A-2012-167808 discloses a mechanical component (third wheel & pinion) having a rotary member (third wheel) made of the silicon serving as the base material. The silicon is more brittle and more likely to fracture compared to metal. Accordingly, if stress applied to the rotary member is strong when an axle member (third pinion) is fitted into a through-hole of the rotary member, the rotary member may be damaged in some cases. Therefore, in order to relax the stress caused by fitting the rotary member and the axle member to each other, the mechanical component disclosed in JP-A-2012-167808 adopts a structure in which a stress relaxation layer made of metal is disposed on an inner peripheral surface of the through-hole of the rotary member so that the stress relaxation layer is brought into contact with an outer peripheral surface of the axle member.

However, according to the mechanical component disclosed in JP-A-2012-167808, a metal film is formed on an entire front surface of the rotary member formed of the silicon serving as the base material. Thereafter, the metal film of a portion other than the inner peripheral surface of the through-hole of the rotary member is removed using a photolithography or etching technique, thereby forming the stress relaxation layer. Therefore, in addition to a step of forming the rotary member, it is necessary to provide a step of forming the metal film and a step of removing a portion of the metal film. Consequently, manufacturing man-hours required for the mechanical component may increase, thereby leading to a possibility of increase in manufacturing cost.

The axle member is formed by carrying out machine work such as cutting work and grinding work. Accordingly, in some cases, there are variations in a size of an outer diameter or an axial length of a portion of the axle member fitted into the through-hole of the rotary member, that is, a portion in contact with the stress relaxation layer. In contrast, the stress relaxation layer is the metal film. Accordingly, if the variations are significant when the machine work is carried out for the axle member, it is difficult to absorb the variations. For example, if the outer diameter of the axle member is small, the stress is insufficient when the rotary member and the axle member are fitted to each other, and the axle member consequently falls out of the rotary member. On the other hand, if the outer diameter of the axle member is large, the stress cannot be completely relaxed by the stress relaxation layer when the rotary member and the axle member are fitted to each other, and the rotary member is consequently damaged. Therefore, if the variations occur when the machine work is carried out for the axle member, there is a possibility that a manufacturing yield of the mechanical component may become poor.

SUMMARY

An advantage of some aspects of the invention is to solve at least a part of the problems described above, and the invention can be implemented as the following forms or application examples.

APPLICATION EXAMPLE 1

A mechanical component according to this application example includes an axle member, and a rotary member that has a holder for holding the axle member, in which the axle member has a recessed portion to be fitted to the holder, and a first tapered portion inclined in an axial direction of the axle member is disposed in a portion where the recessed portion is in contact with the holder.

According to the configuration of the mechanical component according to this application example, the axle member has the recessed portion to be fitted to the holder of the rotary member. The first tapered portion is disposed in the portion where the recessed portion is in contact with the holder. In a case where the first tapered portion is not disposed in the recessed portion, if an axial length of the recessed portion is shorter than a thickness of the holder, the holder does not enter the recessed portion. If the axial length of the recessed portion is longer than the thickness of the holder, the holder and the recessed portion are unsteadily fitted to each other. According to this application example, the first tapered portion inclined in the axial direction is disposed in the recessed portion. Accordingly, even in a case where the axial length of the recessed portion varies, the holder is fitted into the recessed portion by coming into contact with any position of the first tapered portion. Therefore, without disposing a stress relaxation layer in the rotary member, the holder is reliably fitted into the recessed portion, thereby enabling the rotary member and the axle member to be fixed to each other. In this manner, it is possible to prevent an increase in manufacturing man-hours of the mechanical component and a poor manufacturing yield of the mechanical component.

APPLICATION EXAMPLE 2

In the mechanical component according to the application example, it is preferable that the first tapered portion is formed so that a diameter of the first tapered portion decreases as the first tapered portion is closer from one end side to the other end side in the recessed portion.

According to the configuration of the mechanical component according to this application example, the first tapered portion is formed so that the diameter of the first tapered portion decreases as the first tapered portion is closer from one end side to the other end side in the recessed portion. Accordingly, a cross-sectional shape of the first tapered portion serves as an inclined surface facing the other end side in the axial direction. In this manner, stress acting from the first tapered portion toward the other end side is applied to the holder fitted into the recessed portion. Therefore, it is possible to prevent the axle member from falling out of the rotary member.

APPLICATION EXAMPLE 3

In the mechanical component according to the application example, it is preferable that the axle member has a second tapered portion formed on a side opposite to the other end with respect to the recessed portion so that a diameter of the second tapered portion decreases as the second tapered portion is farther away from the recessed portion, and an inclination angle of the first tapered portion in the axial direction is larger than an inclination angle of the second tapered portion in the axial direction.

According to the configuration of the mechanical component according to this application example, the axle member has the second tapered portion formed on the side opposite to the other end with respect to the recessed portion so that the diameter of the second tapered portion decreases as the second tapered portion is farther away from the recessed portion, that is, the diameter increases as the second tapered portion is closer to the recessed portion. Therefore, if the axle member is inserted into the rotary member from the side of the second tapered portion, the holder of the rotary member spreads outward as the holder is closer to the recessed portion in the second tapered portion. In this case, the inclination angle of the second tapered portion in the axial direction is smaller than the inclination angle of the first tapered portion. Accordingly, the stress applied to the holder gradually increases in a direction in which the axle member is inserted into the rotary member. Therefore, the axle member can be easily inserted into the rotary member. On the other hand, if the holder is fitted once into the recessed portion, the inclination angle of the first tapered portion in the axial direction is larger than the inclination angle of the second tapered portion. Accordingly, the stress applied to the holder rapidly increases in a direction in which the axle member falls out of the rotary member. Therefore, it is possible to prevent the axle member from falling out of the rotary member.

APPLICATION EXAMPLE 4

In the mechanical component according to the application example, it is preferable that an outer diameter of the axle member in a boundary portion between the recessed portion and the second tapered portion is larger than an outer diameter of the axle member in a portion where the holder is in contact with the first tapered portion.

According to the configuration of the mechanical component according to this application example, the outer diameter of the axle member in the boundary portion between the recessed portion having the first tapered portion and the second tapered portion is larger than the outer diameter of the portion where the holder is in contact with the first tapered portion. Accordingly, the holder fitted into the recessed portion is less likely to return to the second tapered portion side. Therefore, it is possible to prevent the axle member from falling out of the rotary member.

APPLICATION EXAMPLE 5

In the mechanical component according to the application example, it is preferable that the axle member has a projection portion in contact with the holder, on the other end side of the recessed portion.

According to the configuration of the mechanical component according to this application example, the holder of the rotary member is in contact with the first tapered portion disposed in the recessed portion, and is in contact with the projection portion disposed on the other end side of the recessed portion. Accordingly, the stress acting from the first tapered portion toward the projection portion is applied to the holder. Therefore, it is possible to effectively prevent the axle member from falling out of the rotary member.

APPLICATION EXAMPLE 6

In the mechanical component according to the application example, it is preferable that the rotary member has a rim having a plurality of teeth, the holder has a first holder extending in a direction from the rim toward the axle member, and a second holder having a first portion extending in a direction intersecting the first holder and a second portion extending in the direction from the first portion toward the axle member, and the second portion is in contact with the first tapered portion.

According to the configuration of the mechanical component according to this application example, the first portion extending in the direction intersecting the first holder is bent to the first holder extending in the direction from the rim toward the axle member. Accordingly, the second portion can be deformed in the direction in which the second portion faces the axle member, which is the extending direction of the second portion, and in the direction in which the second portion faces outward from the axle member. In this manner, even in a case where the outer diameter of the axle member in the recessed portion varies, the stress applied to the holder of the rotary member can be relaxed. Accordingly, damage to the rotary member can be prevented. The first portion is bent, and the second portion is deformed, thereby generating the stress. The stress enables the axle member to be located and held at the center of the rotary member.

APPLICATION EXAMPLE 7

In the mechanical component according to the application example, it is preferable that the second holder has a plurality of the first portions.

According to the configuration of the mechanical component according to this application example, the plurality of first portions connecting the first holder and the second portion to each other are likely to be bent in the direction from the rim toward the axle member in a plane configured to include the first holder and the second holder (the first portion and the second portion). The plurality of first portions are provided in this way. Accordingly, even in a case where the outer diameter of the axle member in the recessed portion varies, it is possible to sufficiently obtain the stress for holding the axle member at the center of the rotary member. On the other hand, the plurality of first portions are less likely to be bent in the axial direction (longitudinal direction of the axle member) intersecting the plane configured to include the first holder and the second holder (the first portion and the second portion). Accordingly, the second portion is likely to be deformed in the direction toward the axle member and in the direction outward from the axle member. However, the second portion is less likely to be deformed in the axial direction. Therefore, the rotary member and the axle member can be reliably fixed to each other, and the rotary member can be prevented from being inclined from or falling out of the axle member.

APPLICATION EXAMPLE 8

A timepiece according to this application example includes the mechanical component described above.

According to the configuration of the timepiece according to this application example, the timepiece includes the mechanical component described above in any one of the application examples. Therefore, it is possible to provide a highly accurate timepiece which is excellent in quality and cost competitiveness.

APPLICATION EXAMPLE 9

A manufacturing method of a mechanical component according to this application example includes forming a holder for holding an axle member in a rotary member, forming a recessed portion to be fitted to the holder in the axle member, and inserting the axle member into the rotary member so that the holder is fitted into the recessed portion, in which in the forming of the recessed portion, a first tapered portion is formed so that a diameter of the first tapered portion decreases as the first tapered portion is closer from one end side to the other end side in the recessed portion, and an inner diameter of the holder formed in the forming of the holder is smaller than an outer diameter of the axle member in a portion where the holder fitted into the recessed portion in fitting the holder into the recessed portion is in contact with the first tapered portion.

According to the manufacturing method of a mechanical component according to this application example, in the forming of the recessed portion, the first tapered portion is formed in the recessed portion of the axle member. Accordingly, in a case where the axial length of the recessed portion varies, if the axle member is inserted into the rotary member in fitting the holder into the recessed portion, the holder is fitted into the recessed portion by coming into contact with any position of the first tapered portion. Accordingly, without disposing the stress relaxation layer in the rotary member, the holder is reliably fitted into the recessed portion, thereby enabling the rotary member and the axle member to be fixed to each other. In this manner, it is possible to prevent an increase in manufacturing man-hours of the mechanical component and a poor manufacturing yield of the mechanical component.

The inner diameter of the holder formed in the forming of the holder is smaller than the outer diameter of the axle member in the portion where the holder fitted into the recessed portion in fitting the holder into the recessed portion is in contact with the first tapered portion. Accordingly, if the holder is fitted into the recessed portion, the stress spreading outward in the radial direction is applied from the first tapered portion to the holder. Then, the cross-sectional shape of the first tapered portion serves as the inclined surface which faces the other end side in the axial direction, for the holder fitting to the recessed portion. Therefore, the stress acting from the first tapered portion toward the other end side is applied to the holder fitted into the recessed portion. In this manner, it is possible to prevent the axle member from falling out of the rotary member.

APPLICATION EXAMPLE 10

In the manufacturing method of a mechanical component according to the application example, it is preferable that in the forming of the recessed portion, a second tapered portion is formed on a side opposite to the other end with respect to the recessed portion so that a diameter of the second tapered portion decreases as the second tapered portion is farther away from the recessed portion, and an outer diameter of the axle member in a boundary portion between the recessed portion and the second tapered portion is larger than an outer diameter of the axle member in a portion where the holder fitted into the recessed portion in fitting the holder into the recessed portion is in contact with the first tapered portion.

According to the manufacturing method of a mechanical component according to this application example, the axle member has the second tapered portion formed on the side opposite to the other end with respect to the recessed portion having the first tapered portion so that the diameter of the second tapered portion increases as the second tapered portion is closer to the recessed portion. Accordingly, if the axle member is inserted into the rotary member from the side of the second tapered portion, the holder spreads outward as the holder is closer to the recessed portion in the second tapered portion. Therefore, the axle member can be easily inserted into the rotary member. The outer diameter of the axle member in the boundary portion between the recessed portion and the second tapered portion is larger than the outer diameter of the axle member in the portion where the holder fitted into the recessed portion is in contact with the first tapered portion. Therefore, the holder fitted into the recessed portion having the first tapered portion after crossing the boundary portion from the second tapered portion is less likely to return to the second tapered portion side. In this manner, it is possible to prevent the axle member from falling out of the rotary member.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment according to the invention will be described with reference to the drawings. In the embodiment, a mechanical timepiece will be treated as an example of a timepiece according to the invention. As an example of a mechanical component according to the invention, an escape wheel & pinion serving as one of wheels configuring timepiece components in a movement of the mechanical timepiece will be described as an example. In respective drawings below, in order to allow each layer or each member to have a recognizable size to some extent, in some cases, each layer or each member is illustrated using scales different from actual scales.

Mechanical Timepiece

Figure 1:
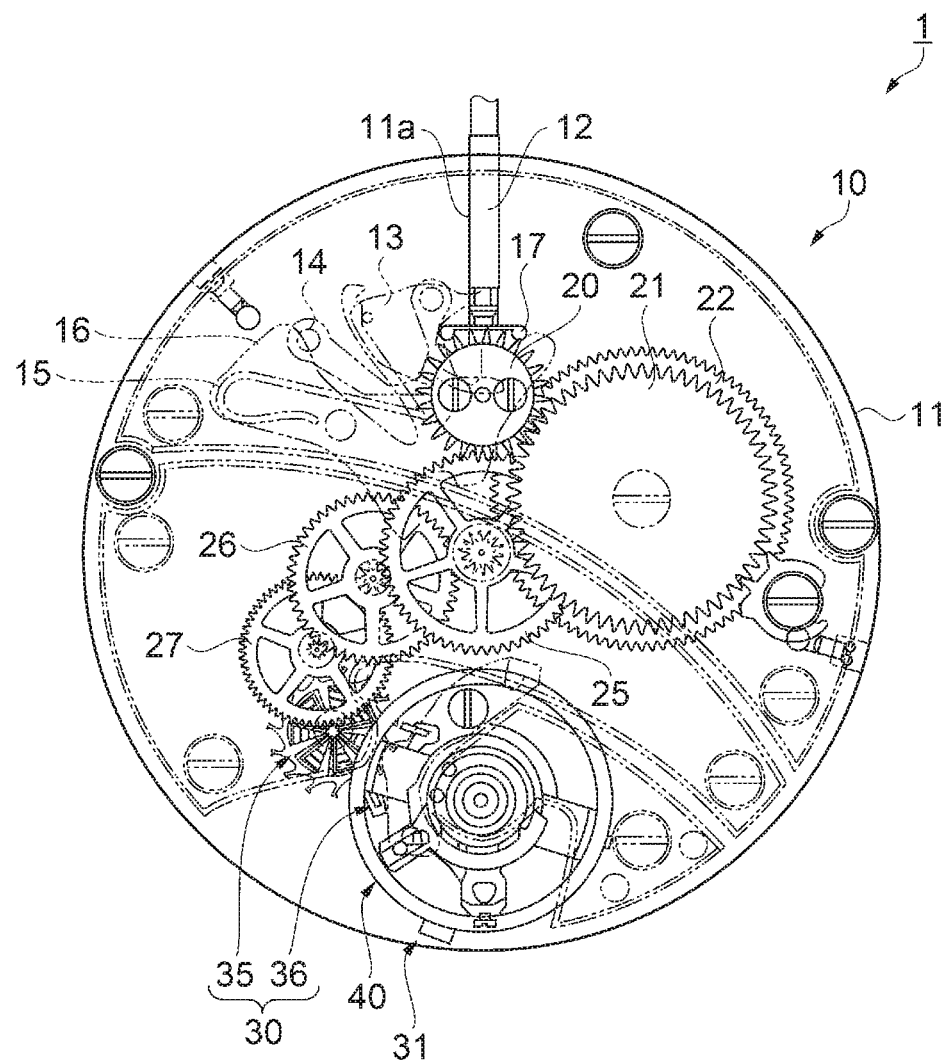
FIG. 1 is a plan view illustrating a front side of a movement of a mechanical timepiece according to the present embodiment.

First, a mechanical timepiece 1 serving as the timepiece according to the embodiment will be described. FIG. 1 is a plan view illustrating a front side of the movement of the mechanical timepiece according to the embodiment. As illustrated in FIG. 1, the mechanical timepiece 1 according to the embodiment is configured to include a movement 10 and a casing (not illustrated) for accommodating the movement 10.

A side outward of a paper surface in FIG. 1 is referred to as a front side, and a side inward thereof is referred to as a rear side. The movement 10 has a main plate 11 configuring a substrate. A dial (not illustrated) is located on the rear side of the main plate 11. A wheel train incorporated on the front side of the movement 10 is referred to as a front train wheel, and a wheel train incorporated on the rear side of the movement 10 is referred to as a rear wheel train.

The main plate 11 has a winding stem guide hole 11a formed therein, and a winding stem 12 is rotatably incorporated in the winding stem guide hole 11a. The winding stem 12 is determined to have an axial position by a switching device having a setting lever 13, a yoke 14, a yoke spring 15, and a setting lever jumper 16. A winding pinion 17 is rotatably disposed in a guide axle portion of the winding stem 12.

Based on this configuration, if the winding stem 12 is rotated in a state where the winding stem 12 is located at a first winding stem position ($0\text{-}^{th}$ stage) closest to an inner side of the movement 10 along a rotation axis direction, the winding pinion 17 is rotated via rotation of a clutch wheel (not illustrated). Thereafter, the winding pinion 17 is rotated, thereby rotating a crown wheel 20 meshing with the winding pinion 17. Thereafter, the crown wheel 20 is rotated, thereby rotating a ratchet wheel 21 meshing with the crown wheel 20. Furthermore, the ratchet wheel 21 is rotated, thereby winding a mainspring (power source) (not illustrated) accommodated in a movement barrel 22.

In addition to the above-described movement barrel (mechanical component) 22, the front train wheel of the movement 10 is configured to include a center wheel & pinion (mechanical component) 25, a third wheel & pinion (mechanical component) 26, and a second wheel & pinion (mechanical component) 27 which are so-called wheels & pinions, and has a function to transmit a rotational force of the movement barrel 22. An escapement mechanism 30 and a speed control mechanism 31 for controlling the rotation of the front train wheel are arranged on the front side of the movement 10.

The center wheel & pinion 25 meshes with the movement barrel 22. The third wheel & pinion 26 meshes with the center wheel & pinion 25. The second wheel & pinion 27 meshes with the third wheel & pinion 26. The escapement mechanism 30 controls the rotation of the above-described front train wheel, and includes an escape wheel & pinion (mechanical component) 35 meshing with the second wheel & pinion 27 and a pallet fork (mechanical component) 36 which causes the escape wheel & pinion 35 to escape so as to be regularly rotated. The speed control mechanism 31 controls speed of the above-described escapement mechanism 30, and includes a balance with hairspring (mechanical component) 40.

Escape Wheel & Pinion

Figure 2:
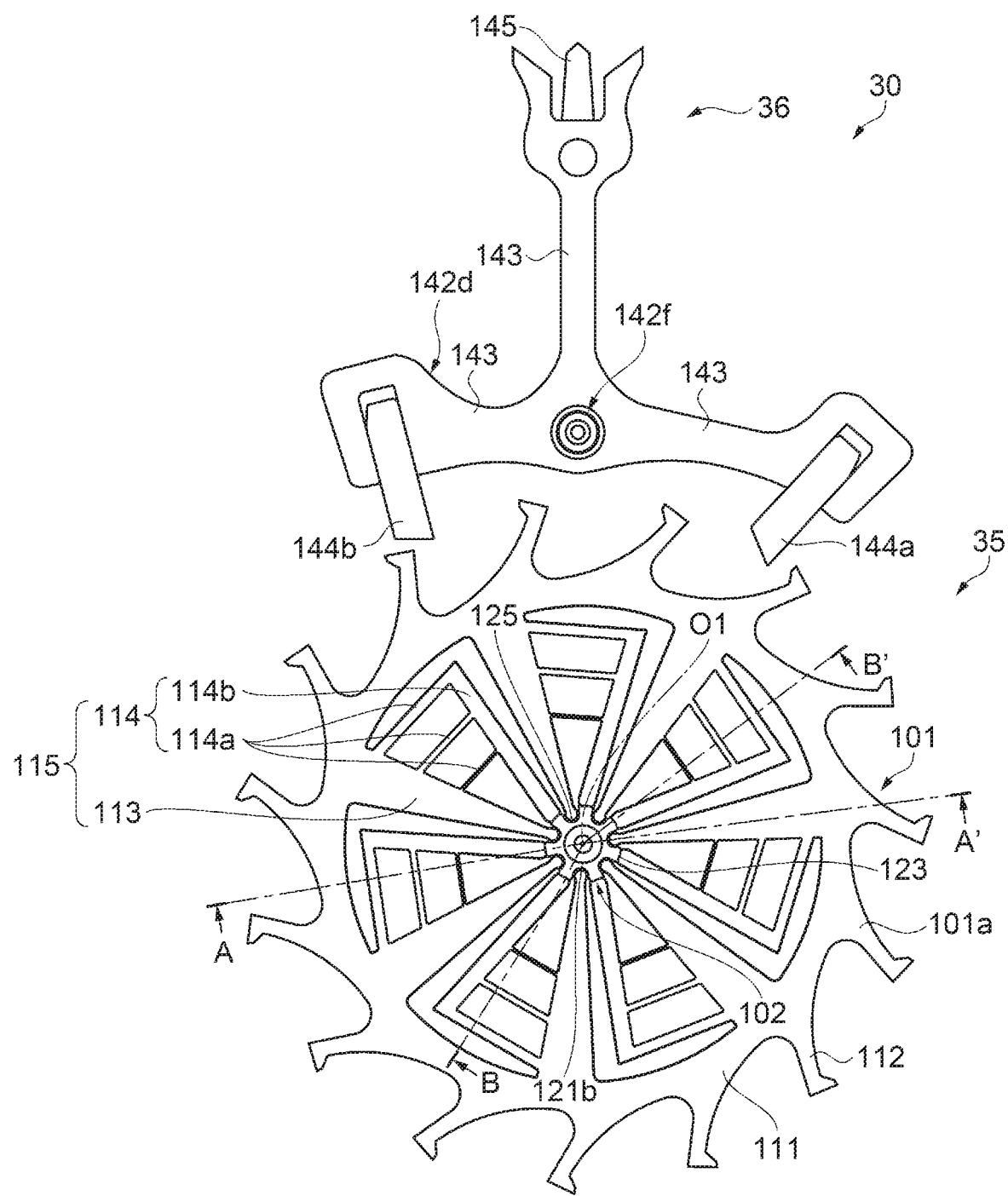
FIG. 2 is a plan view illustrating an escapement mechanism according to the embodiment.
Figure 3:
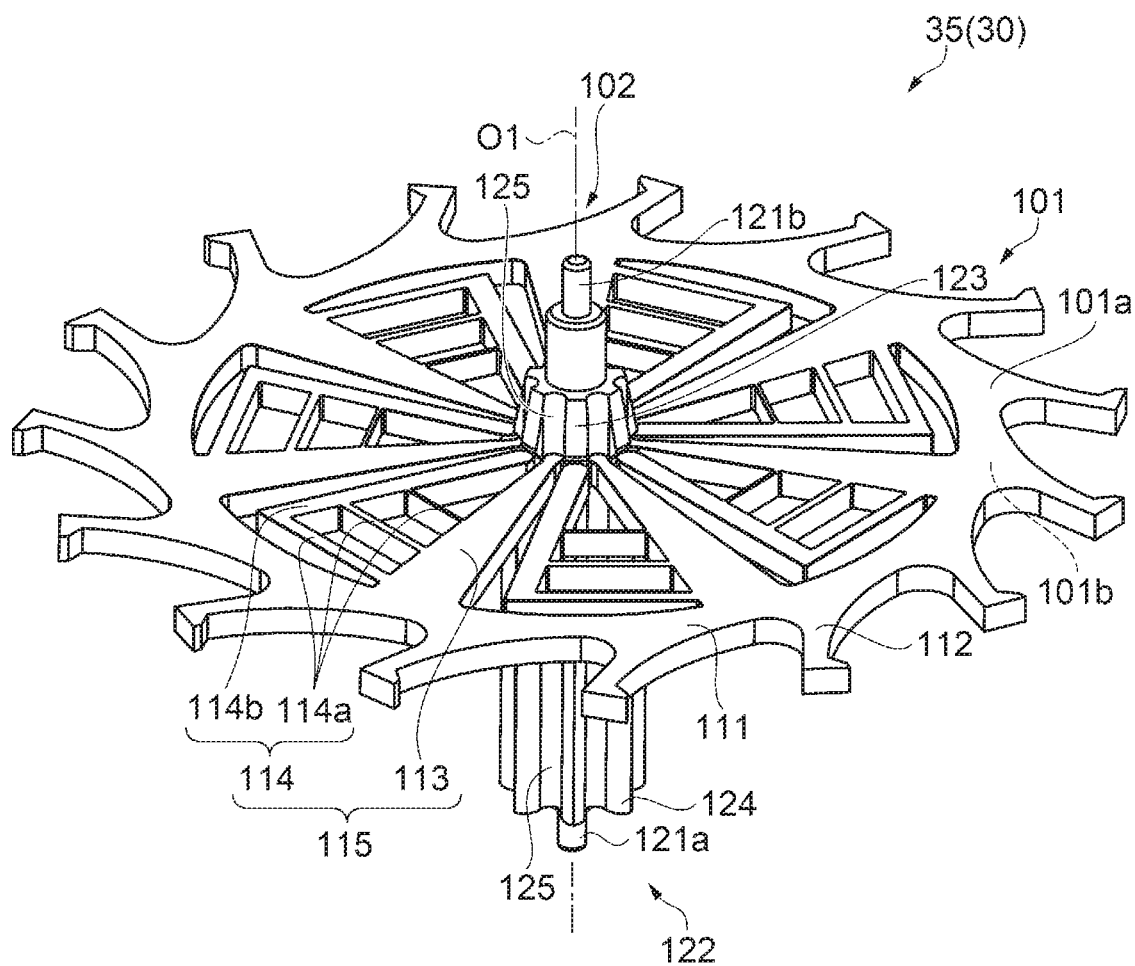
FIG. 3 is a perspective view when an escape wheel & pinion serving as a mechanical component according to the embodiment is viewed from a front surface side.
Figure 4:
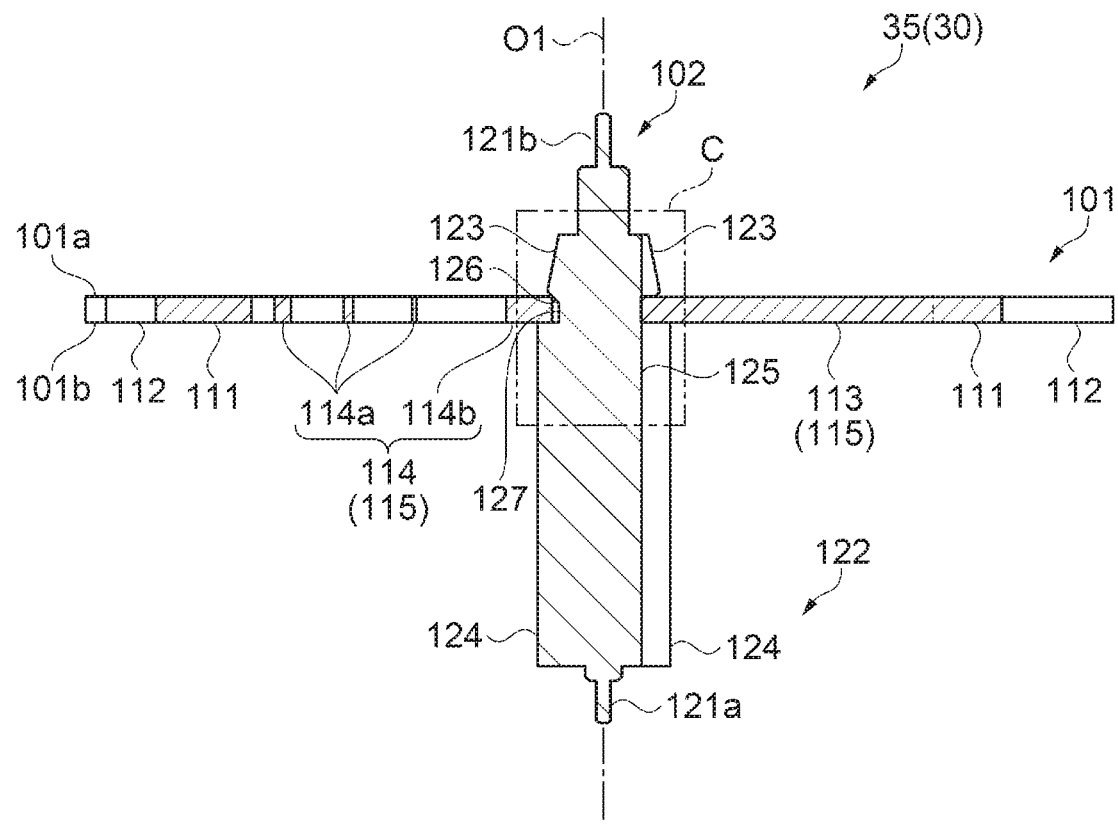
FIG. 4 is a sectional view of the escape wheel & pinion which is taken along line A-A' in FIG. 2.
Figure 5:
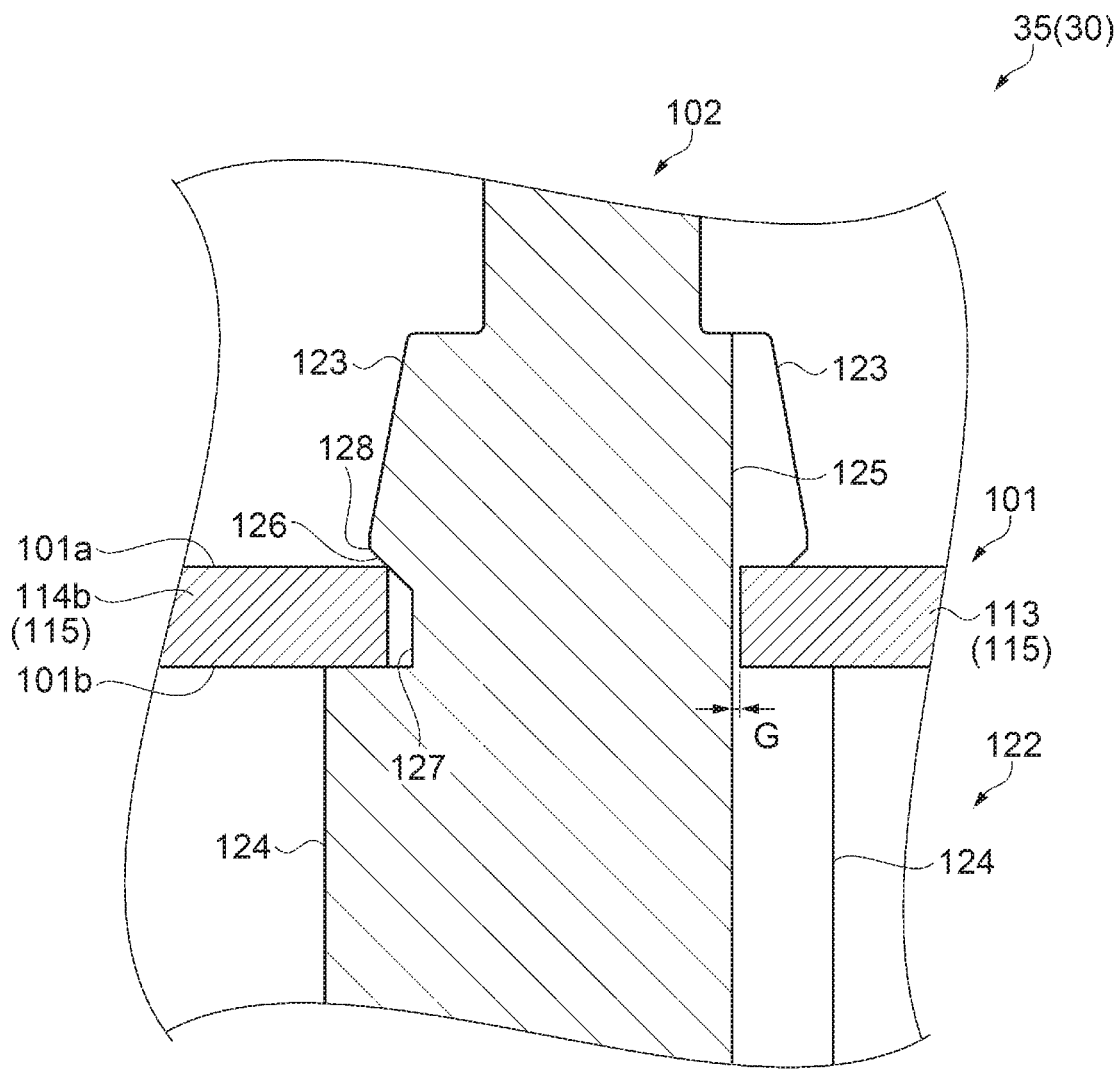
FIG. 5 is a partial sectional view obtained by enlarging a C-portion illustrated in FIG. 4.
Figure 6:
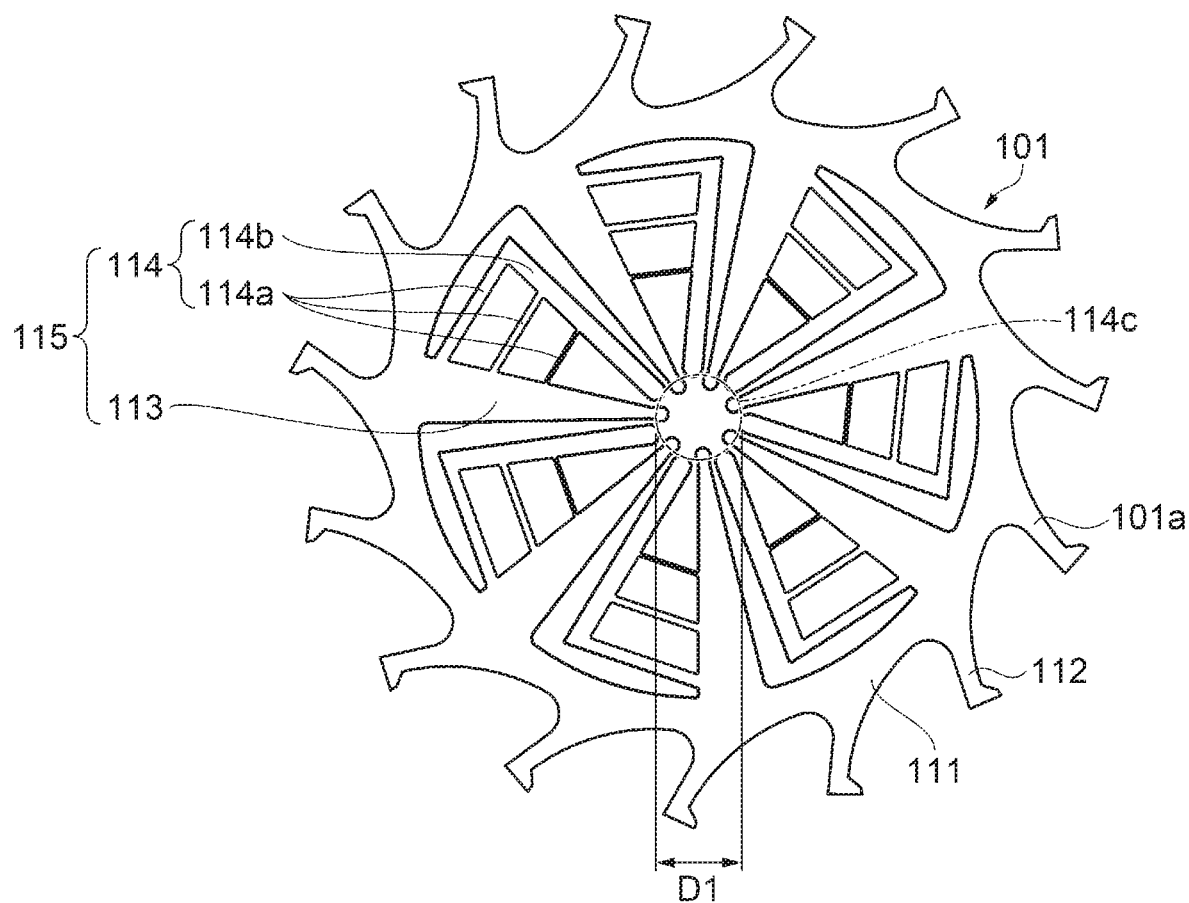
FIG. 6 is a plan view illustrating an escape wheel serving as a rotary member according to the embodiment.
Figure 7:
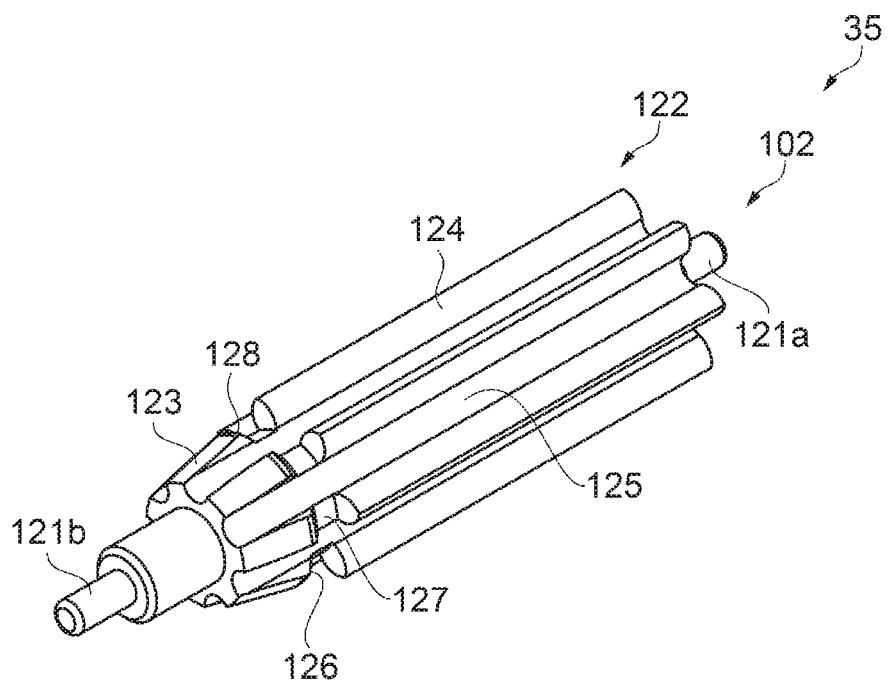
FIG. 7 is a perspective view illustrating an axle member according to the embodiment.
Figure 8:
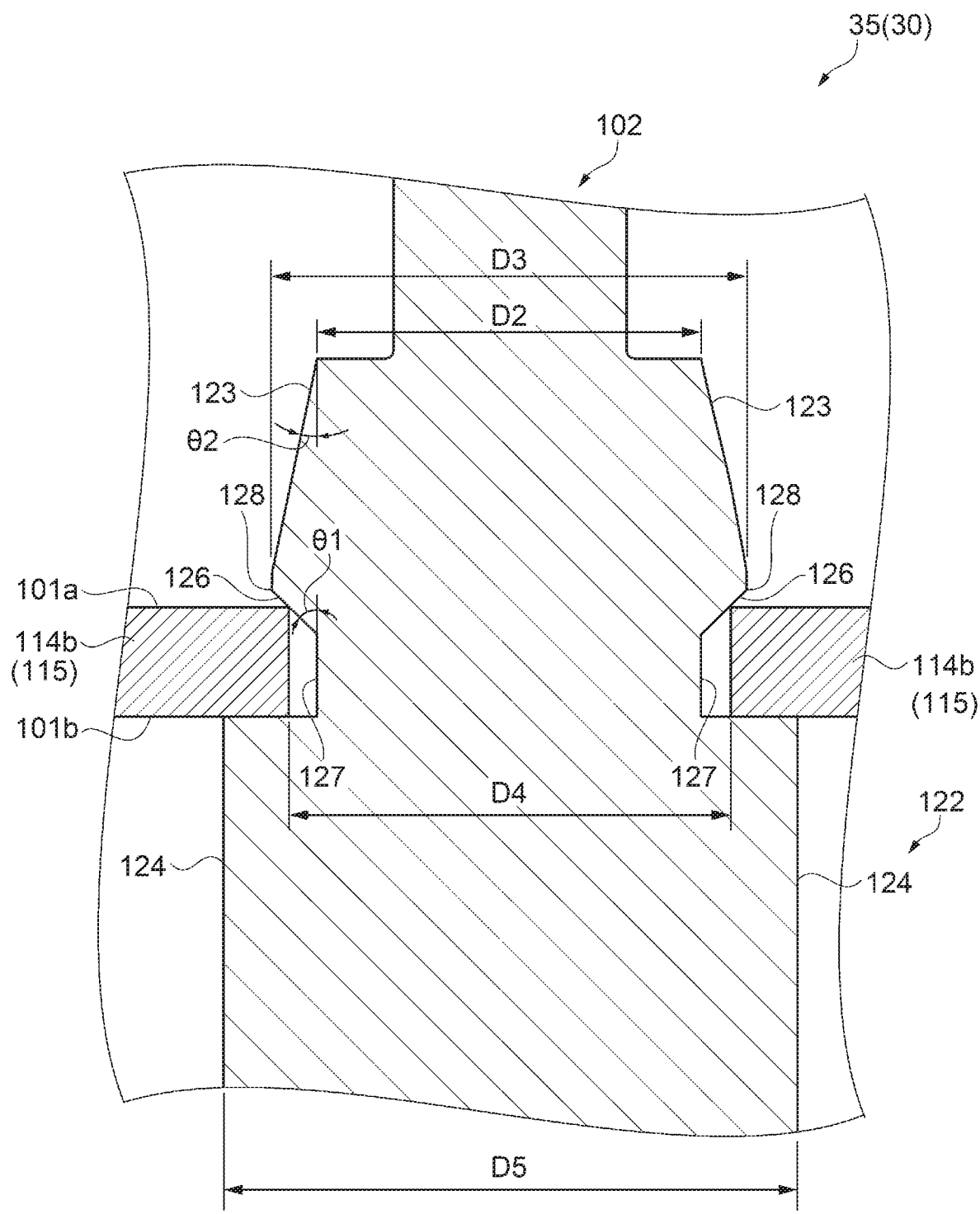
FIG. 8 is a sectional view of the axle member which is taken along line B-B' in FIG. 2.
Figure 9:
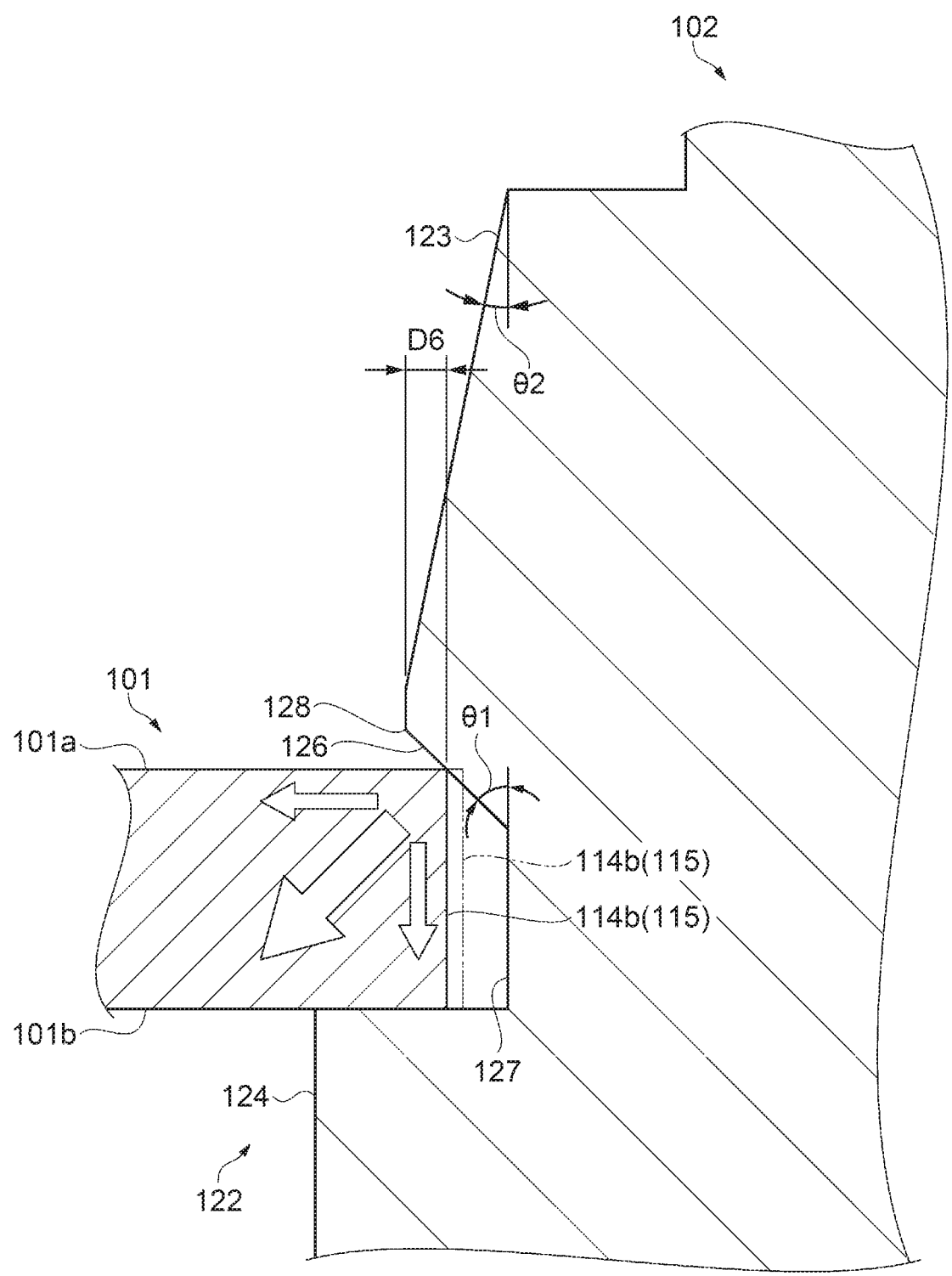
FIG. 9 is a partial sectional view for describing fitting between the escape wheel and the axle member.

Next, the escape wheel & pinion 35 included in the escapement mechanism 30 according to the embodiment will be described in more detail. FIG. 2 is a plan view of the escapement mechanism according to the embodiment. FIG. 3 is a perspective view when the escape wheel & pinion serving as the mechanical component according to the embodiment is viewed from the front surface side. FIG. 4 is a sectional view of the escape wheel & pinion which is taken along line A-A' in FIG. 2. FIG. 5 is a partial sectional view obtained by enlarging a C-portion illustrated in FIG. 4. FIG. 6 is a plan view of the escape wheel serving as a rotary member according to the embodiment. FIG. 7 is a perspective view of an axle member according to the embodiment. FIG. 8 is a sectional view of the axle member which is taken along line B-B' in FIG. 2. FIG. 9 is a partial sectional view for describing fitting between the escape wheel and the axle member.

As illustrated in FIGS. 2 and 3, the escape wheel & pinion 35 included in the escapement mechanism 30 includes an escape wheel 101 as a rotary member and an axle member (rotary axle) 102 coaxially (axis O1) fixed to the escape wheel 101.

In the following description, a longitudinal direction along the axis O1 of the escape wheel 101 and the axle member 102 is simply referred to as an axial direction. A front surface 101a and a rear surface 101b of the escape wheel 101 are orthogonal to the axis O1 (line passing the center of the axle member 102 along the axial direction). A direction passing through the axis O1 in a plane parallel to the front surface 101a and the rear surface 101b of the escape wheel 101 is referred to as a radial direction. A direction in which the escape wheel 101 and the axle member 102 turn around the axis O1 is referred to as a circumferential direction.

In the escape wheel 101, the front surface 101a and the rear surface 101b (refer to FIG. 3) have a plate shape which is formed into a flat surface and has a uniform thickness over the entire surface. The escape wheel 101 is made of a material having a crystal orientation such as single crystal silicon, or a metal material.

The escape wheel 101 has a rim 111 having a plurality of teeth 112 and a holder (web arm) 115 for holding the axle member 102. The rim 111 is the annular portion of an outer edge of the escape wheel 101. The tooth 112 protrudes outward from an outer periphery of the rim 111, and is formed in a special hook shape. The pallets 144a and 144b of a pallet fork 36 (to be described later) come into contact with a tip of the plurality of teeth 112.

The holder 115 is located on the axle member 102 side with respect to the rim 111. In the embodiment, the escape wheel 101 has seven holders 115. The holders 115 are located at seven positions at an equal pitch of 360°/7 in the circumferential direction of the annular rim 111. The number of the holders 115 may be in a range of three to seven, or may be seven or more, and is not particularly limited.

The holder 115 has a first holder (spoke) 113 extending from the rim 111 and a second holder (comb) 114 branched from the first holder 113. The first holder 113, the second holder 114 (first portion 114a (cross beam) and second portion 114b (spine)), and the rim 111 are integrally formed of the same material.

The axle member 102 is inserted into a region surrounded by the holders 115 (first holder 113 and second holder 114) of a central portion of the escape wheel 101. In other words, a through-hole through which the axle member 102 is inserted into the central portion of the escape wheel 101 is configured to include the holder 115 (first holder 113 and second holder 114).

The first holder 113 extends in a direction from the rim 111 toward the axle member 102. The first holder 113 has a function to prevent the rotation of the escape wheel 101 with respect to the axle member 102 by being fitted into a groove 125 of the axle member 102. The tip of the first holder 113 is located on a center side of the axle member 102 from the tip of the second portion 114b of the second holder 114 (refer to FIG. 6).

The second holder 114 has the first portion 114a and the second portion 114b. The second holder 114 has a function to fix the axle member 102 to the center of the escape wheel 101 and to prevent the escape wheel 101 from being inclined from or falling out of the axle member 102.

The first portion 114a is connected to the first holder 113, is branched from the first holder 113, and extends in a direction intersecting the extending direction of the first holder 113. The second holder 114 has a plurality of the first portions 114a. The plurality of first portions 114a are arranged substantially parallel to each other. The second portion 114b is connected to the plurality of first portions 114a, and extends in a direction toward the axle member 102. The plurality of first portions 114a have a function to relax the stress applied to the second portion 114b in the extending direction of the second portion 114b.

The second portion 114b is fitted into the recessed portion 127 of the axle member 102 (refer to FIGS. 4 and 5). An inscribed circle in contact with the tip of the second portion 114b will be referred to as an inscribed circle 114c (refer to FIG. 6). In a state where the second portion 114b is not fitted into the recessed portion 127 (state where the axle member 102 is not inserted into the escape wheel 101), that is, in a state where the stress is not applied to the second holder 114, a diameter of the inscribed circle 114c set to D1. The diameter D1 of the inscribed circle 114c is also called an inner diameter of the second holder 114. The first holder 113 extends inward of the inscribed circle 114c.

If the escape wheel 101 is viewed from the axle member 102, the first holder 113 and the second portion 114b respectively and radially extend outward in the radial direction. In a plane parallel to the front surface 101a of the escape wheel 101, the extending direction of the first holder 113 and the extending direction of the second portion 114b are respectively directions along the radial direction, but are not parallel to each other. The extending direction of the first portion 114a is a direction intersecting the extending direction of the first holder 113 and the extending direction of the second portion 114b in a plane parallel to the front surface 101a of the escape wheel 101.

The plurality of first portions 114a formed in a beam shape between the first holder 113 and the second portion 114b are less likely to be bent in the extending direction, in a plane (the front surface 101a of the escape wheel 101 and the rear surface 101b) configured to include the plurality of first portions 114a, but are likely to be bent in the direction intersecting the extending direction. The plurality of first portions 114a are less likely to be bent in the axial direction intersecting the plane configured to include the plurality of first portions 114a.

If the plurality of first portions 114a are bent and deformed outward in the extending direction of the second portion 114b, the inner diameter of the second holder 114, that is, the diameter of the inscribed circle 114c (refer to FIG. 6) in contact with the tip of the second portion 114b becomes larger than the diameter D1. Therefore, when the axle member 102 is inserted into the escape wheel 101, the plurality of first portions 114a are bent corresponding to the outer diameter of the axle member 102, and are deformed in the extending direction of the second portion 114b with respect to the axle member 102. In this manner, the second portion 114b can be easily fitted into the recessed portion 127. The maximum diameter of the inscribed circle 114c where the plurality of first portions 114a can be bent and deformed is set to D1max.

When an external force is applied to the escape wheel & pinion 35, the plurality of first portions 114a are likely to be deformed in extending direction of the second portion 114b. Accordingly, the axle member 102 can be held at the center of the escape wheel 101. Since the plurality of first portions 114a are bent, it is possible to relax the external force applied to the escape wheel & pinion 35. Accordingly, damage to the escape wheel 101 can be prevented. On the other hand, the plurality of first portions 114a are less likely to be deformed in the axial direction, that is, in the direction where the axle member 102 falls out of the escape wheel 101. Therefore, the escape wheel 101 and the axle member 102 can be reliably fixed to each other, and the escape wheel 101 can be prevented from being inclined from or falling out of the axle member 102.

The plurality of the teeth 112 of the escape wheel & pinion 35 (escape wheel 101) are adapted to mesh with the pallet fork 36. The pallet fork 36 includes a pallet fork body 142d formed into a T-shape by three pallet fork beams 143 and a pallet staff 142f serving as an axle. The pallet fork body 142d is configured to be pivotable by the pallet staff 142f. Both ends of the pallet staff 142f are respectively supported so as to be pivotable with respect to the main plate 11 (refer to FIG. 1) and a pallet bridge (not illustrated).

In the three pallet fork beams 143, pallets 144a and 144b are disposed at the tip of the two pallet fork beams 143, and a guard pin 145 is attached to the tip of the remaining pallet fork beam 143. The pallets 144a and 144b are ruby formed in a square pillar shape, and fixedly adheres to the pallet fork beam 143 by using an adhesive.

When the pallet fork 36 configured in this way pivots around the pallet staff 142f, the pallet 144a or the pallet 144b comes into contact with the tip of the tooth 112 of the escape wheel & pinion 35. In this case, the pallet fork beam 143 to which the guard pin 145 is attached comes into contact with a banking pin (not illustrated) so that the pallet fork 36 does not further pivot in the same direction. As a result, the rotation of the escape wheel & pinion 35 is temporarily stopped.

As illustrated in FIG. 2, in a plan view when viewed in the axial direction of the axle member 102, the axle member 102 is located in the central portion of the escape wheel 101. As illustrated in FIGS. 3 and 4, the axle member 102 is inserted from the rear surface 101b side into the through-hole surrounded by the holder 115 of the escape wheel 101. The axle member 102 has a recessed portion 127 (refer to FIG. 4) fitted to the holder 115. The holder 115 (the second portion 114b of the second holder 114) of the escape wheel 101 is fitted into the recessed portion 127 of the axle member 102. In this manner, the axle member 102 is fixed to the escape wheel 101.

The axle member 102 is made of carbon steel which is excellent in rigidity and heat resistance and which allows high workability in carrying out cutting work and grinding work. A material of the axle member 102 may be tantalum (Ta) or tungsten (W). The axle member 102 has tenon portions 121a and 121b, an escape pinion portion 122 serving as a projection portion, the recessed portion 127, a tapered portion 126 serving as a first tapered portion, and a guide portion 123 serving as a second tapered portion.

The tenon portions 121a and 121b are located at both ends of the axle member 102 in the axial direction. In the tenon portions 121a and 121b, the tenon portion 121a located on the rear surface 101b side of the escape wheel 101 is rotatably supported by a train wheel bridge (not illustrated), and the tenon portion 121b located on the front surface 101a side of the escape wheel 101 is rotatably supported by the main plate 11.

The escape pinion portion 122 is disposed on the rear surface 101b side of the escape wheel 101. The escape pinion portion 122 is formed on the tenon portion 121a side with respect to the recessed portion 127 along the axial direction of the axle member 102. In the escape pinion portion 122, a portion on the escape wheel 101 side has a function as a projection portion, and a portion on the tenon portion 121a side has a function as the wheel. The portion of the escape pinion portion 122 on the tenon portion 121a side meshes with the wheel of the second wheel & pinion 27 (refer to FIG. 1). In this manner, a rotational force of the second wheel & pinion 27 is transmitted to the axle member 102, and the escape wheel & pinion 35 is rotated.

The escape pinion portion 122 has the plurality of teeth 124. The plurality of teeth 124 extend along the axial direction of the axle member 102, and are formed so as to protrude outward in the radial direction. An end portion of the plurality of teeth 124 on the tenon portion 121b side is in contact with the rear surface 101b of the holder 115 (second portion 114b) of the escape wheel 101. A groove 125 is formed along the axial direction between the plurality of teeth 124 in the circumferential direction. The groove 125 extends from the escape pinion portion 122 through the recessed portion 127 to the guide portion 123 along the axial direction (refer to FIG. 7).

In the embodiment, the escape pinion portion 122 has seven teeth 124. The teeth 124 are respectively arranged at seven positions at an equal pitch of 360°/7 in the circumferential direction of the escape pinion portion 122. Therefore, the grooves 125 are also respectively arranged at seven positions at an equal pitch of 360°/7 in the circumferential direction of the escape pinion portion 122. Although the number of the teeth 124 and the grooves 125 is seven in the embodiment, the number may be in a range of three to seven, or seven or more, and is not particularly limited.

The guide portion 123 serving as the second tapered portion is disposed on the front surface 101a side of the escape wheel 101. The guide portion 123 is formed on the tenon portion 121b side opposite to the escape pinion portion 122 with respect to the recessed portion 127. The guide portion 123 is formed to have the diameter larger than that of the tenon portions 121a and 121b. The guide portion 123 has a function to guide the second portion 114b of the holder 115 when the axle member 102 is inserted into the escape wheel 101.

The guide portion 123 is formed so that the diameter decreases as the guide portion 123 is farther away from the recessed portion 127 to the tenon portion 121b side. In other words, the guide portion 123 is formed so that the diameter increases as the guide portion 123 is closer to the recessed portion 127 fitted to the holder 115 of the escape wheel 101 from the tenon portion 121b side inserted into the escape wheel 101. The guide portion 123 is divided by the groove 125 in the circumferential direction. Therefore, the guide portions 123 are respectively arranged at seven positions at an equal pitch of 360°/7 in the circumferential direction on the tenon portion 121b side of the axle member 102. The guide portions 123 and the teeth 124 are disposed at the same position in the circumferential direction of the axle member 102.

A cross section of the escape wheel & pinion 35 illustrated in FIGS. 4 and 5 is taken along line A-A' in FIG. 2. That is, the left side in FIGS. 4 and 5 is a cross section passing through the guide portion 123 of the axle member 102 and the tooth 124 of the escape pinion portion 122, and the right side is a cross section passing through the groove 125 of the axle member 102.

As illustrated in FIGS. 4 and 5, the groove 125 is linearly disposed along the axial direction from the escape pinion portion 122 throughout the guide portion 123. The groove 125 is formed so as to be recessed inward of the tooth 124, the recessed portion 127, and the guide portion 123 of the escape pinion portion 122 in the radial direction (refer to FIG. 7). The groove 125 has a function to prevent the rotation of the escape wheel 101 with respect to the axle member 102 by being fitted to the first holder 113.

As illustrated in FIG. 5, the first holder 113 is fitted into the groove 125 at a position where the recessed portion 127 is disposed in the axial direction (upward-downward direction in FIG. 5). In a state where the first holder 113 is fitted into the groove 125, a gap G is designed to exist between the first holder 113 and the groove 125. In this state, the stress is not generated between the axle member 102 and the first holder 113. However, when an external force is applied to the escape wheel & pinion 35 in a state where the mechanical timepiece 1 (movement 10) having the escape wheel & pinion 35 incorporated therein is operated, the first holder 113 may come into contact with the axle member 102.

As illustrated in FIG. 7, the groove 125 is disposed so as to be recessed from the recessed portion 127, thereby forming a step difference between the groove 125 and the recessed portion 127 in the circumferential direction. In the groove 125, the tip of the first holder 113 is located on the center side of the axle member 102 from the recessed portion 127 (refer to FIG. 4). Therefore, even if the external force is applied to the circumferential direction which is the rotation direction of the escape wheel & pinion 35, a state where the first holder 113 is fitted into the groove 125 is held. In this manner, the escape wheel 101 can be prevented from being rotated with respect to the axle member 102.

The groove 125 is disposed from the guide portion 123 throughout the escape pinion portion 122. Accordingly, when the axle member 102 is inserted into the escape wheel 101 from the tenon portion 121b side, if the position of the first holder 113 is aligned with the position of the groove 125, the axle member 102 can be inserted into the escape wheel 101 in a state where the first holder 113 is fitted into the groove 125 (refer to FIG. 4).

The recessed portion 127 is disposed between the guide portion 123 and the escape pinion portion 122 in the axial direction. In other words, the axle member 102 has the guide portion 123 on one end side (tenon portion 121b side) of the recessed portion 127, and the escape pinion portion 122 (tooth 124) on the other end side (tenon portion 121a side) of the recessed portion 127. The recessed portion 127 is disposed to turn around the axis O1 (refer to FIG. 4) of the axle member 102.

A cross section of the escape wheel & pinion 35 illustrated in FIG. 8 is taken along line B-B' in FIG. 2, and is laterally symmetrical. That is, both the left side and right side in FIG. 8 are cross sections passing through the guide portion 123 of the axle member 102 and the tooth 124 of the escape pinion portion 122.

As illustrated in FIG. 8, the recessed portion 127 is formed so as to be recessed inward (toward the center side of the axle member 102) of the tooth 124 and the guide portion 123 of the escape pinion portion 122 in the radial direction. The recessed portion 127 has a function to prevent the axle member 102 from falling out of the escape wheel 101 by being fitted to the second portion 114b of the holder 115.

The recessed portion 127 has the tapered portion 126 serving as the first tapered portion. The tapered portion 126 is disposed on one end side (tenon portion 121b side) in the recessed portion 127. The tapered portion 126 is in contact with the second portion 114b. In other words, the tapered portion 126 is disposed in a portion in contact with the holder 115 (second portion 114b) of the recessed portion 127. The second portion 114b is not in contact with the bottom portion of the recessed portion 127 since the second portion 114b is fitted into the recessed portion 127 in contact with the tapered portion 126.

The tapered portion 126 is formed so that the diameter decreases as the tapered portion 126 is closer to the escape pinion portion 122 from the guide portion 123 side in the axial direction. Therefore, the outer diameter of the axle member 102 from the tenon portion 121b to the other end side (tenon portion 121a side) of the recessed portion 127 increases toward a boundary portion 128 between the tapered portion 126 and the guide portion 123 from the tenon portion 121b side. After reaching the boundary portion 128, the outer diameter of the axle member 102 decreases as the axle member 102 is closer to the escape pinion portion 122 in the tapered portion 126.

The boundary portion 128 is located between the tapered portion 126 and the guide portion 123 in the axle member 102. For example, in a case where a cross-sectional shape of the portion extending from the tapered portion 126 throughout the guide portion 123 in the axle member 102 is a triangular shape having the tapered portion 126 and the guide portion 123 as a hypotenuse, an apex of the triangular shape is set as the boundary portion 128. In a case where the cross-sectional shape is a trapezoidal shape having the tapered portion 126 and the guide portion 123 as the hypotenuse, a top bottom of the trapezoidal shape is set as the boundary portion 128.

The tapered portion 126 inclined in the axial direction is disposed in the recessed portion 127. Accordingly, even if the axial length of the recessed portion 127 varies, the holder 115 (second portion 114b) is fitted into the recessed portion 127 by coming into contact with any position of the tapered portion 126. That is, the tapered portion 126 can absorb the variations in the axial length of the recessed portion 127. Therefore, without disposing the stress relaxation layer in the escape wheel 101, the holder 115 is reliably fitted into the recessed portion 127, thereby enabling the escape wheel 101 and the axle member 102 to be fixed to each other.

Here, an outer diameter D2 of the axle member 102 in an end portion of the guide portion 123 on the tenon portion 121b side is preferably equal to or smaller than the inner diameter of the second holder 114 in a state where the axle member 102 is not inserted into the escape wheel 101, that is, the diameter D1 (refer to FIG. 6) of the inscribed circle 114c of the second portion 114b. If the outer diameter D2 of the axle member 102 is equal to or smaller than the diameter D1 of the inscribed circle 114c of the second portion 114b, when the axle member 102 is inserted into the escape wheel 101 from the tenon portion 121b side, the axle member 102 can be easily inserted into the inscribed circle 114c of the second portion 114b.

An outer diameter D4 of the axle member 102 in a portion where the second portion 114b is in contact with the tapered portion 126 in a state where the holder 115 is fitted to the recessed portion 127 is larger than the outer diameter D1 of the inscribed circle 114c of the second portion 114b in a state where the axle member 102 is not inserted. An outer diameter D3 of the axle member 102 in the boundary portion 128 is larger than the diameter D1 of the inscribed circle 114c of the second portion 114b. The outer diameter D3 of the axle member 102 in the boundary portion 128 is larger than the outer diameter D4 of the axle member 102 in a portion where the second portion 114b is in contact with the tapered portion 126 in a state where the holder 115 is fitted into the recessed portion 127.

Therefore, in a state where the holder 115 is fitted into the recessed portion 127, if the second portion 114b attempts to move in a direction where the second portion 114b is shifted relative to the guide portion 123 side with respect to the axle member 102, that is, in a direction where the axle member 102 falls out of the escape wheel 101, the stress applied to the second portion 114b increases toward the boundary portion 128. In this manner, the axle member 102 is prevented from falling out of the escape wheel 101.

However, the outer diameter D3 of the axle member 102 in the boundary portion 128 is set to be equal to or smaller than a maximum diameter D1max of the inscribed circle 114c in which the plurality of first portions 114a (refer to FIG. 6) can be bent and deformed outward in the extending direction of the second portion 114b. If the outer diameter D3 of the axle member 102 in the boundary portion 128 exceeds the maximum diameter D1max of the inscribed circle 114c, the second portion 114b cannot be fitted into the recessed portion 127 after crossing the boundary portion 128 from the guide portion 123.

Furthermore, a diameter D5 of a circumscribed circle of the tooth 124 of the escape pinion portion 122 is larger than the outer diameter D3 of the axle member 102 in the boundary portion 128, and is larger than the maximum diameter D1max of the inscribed circle 114c. In this manner, even if the plurality of first portions 114a are bent and the second portion 114b is moved outward to the maximum in the radial direction, the second portion 114b does not cross the tooth 124 of the escape pinion portion 122. That is, the tooth 124 of the escape pinion portion 122 regulates a position of the holder 115 on the tenon portion 121a (refer to FIG. 4) side in the axial direction.

FIG. 9 is a partial sectional view obtained by enlarging the left side portion in FIG. 8. In FIG. 9, a position of the tip of the second portion 114b in a state where the axle member 102 is not inserted is illustrated by a two-dot chain line. In other words, the position of the tip of the second portion 114b when the diameter of the inscribed circle 114c of the second portion 114b is set to D1 is illustrated by the two-dot chain line. The position of the tip of the second portion 114b in a state where the holder 115 is fitted into the recessed portion 127 is illustrated by a solid line. In the state where the holder 115 is fitted into the recessed portion 127, the diameter of the inscribed circle 114c of the second portion 114b is the same as the outer diameter D4 of the axle member 102. In a case where a corner portion of the second portion 114b is rounded or is formed into a tapered shape, the diameter of the inscribed circle 114c of the second portion 114b becomes smaller than the outer diameter D4 of the axle member 102.

As illustrated in FIG. 9, in a state where the axle member 102 is inserted and the holder 115 is fitted into the recessed portion 127, compared to a state where the axle member 102 is not inserted, the second portion 114b spread outward in the radial direction. In this manner, the stress acting outward in the radial direction is applied to the second portion 114b. Accordingly, the holder 115 can hold a state of being fitted into the recessed portion 127.

A distance in the radial direction between the position of the tip of the second portion 114b and the boundary portion 128 in a state where the holder 115 is fitted into the recessed portion 127 is set to D6. The distance D6 is half of a difference between the outer diameter D3 of the axle member 102 in the boundary portion 128 and the outer diameter D4 of the axle member 102 in the portion where the second portion 114b is in contact with the tapered portion 126, that is, D6=(D3−D4)/2. The distance D6 is preferably set to approximately 10 If the distance D6 is small, in a case where the external force is applied so as to spread the second portion 114b outward in the radial direction, there is a possibility that the second portion 114b may be shifted to the guide portion 123 side after crossing the boundary portion 128.

The cross-sectional shape of the tapered portion 126 serves as the inclined surface which faces outward in the radial direction of the axle member 102 and the escape pinion portion 122 side in the axial direction. On the other hand, the cross-sectional shape of the guide portion 123 serves as the inclined surface which faces outward in the radial direction of the axle member 102 and the tenon portion 121b side in the axial direction. An inclination angle of the tapered portion 126 in the axial direction is set to θ1, and an inclination angle of the guide portion 123 in the axial direction is set to θ2. The inclination angle θ1 of the tapered portion 126 in the axial direction is larger than the inclination angle θ2 in the axial direction of the guide portion 123.

The inclination angle θ1 in the axial direction of the tapered portion 126 is larger than the inclination angle θ2 in the axial direction of the guide portion 123. Accordingly, the stress applied to the second portion 114b rapidly increases in the direction where the holder 115 moves from the tapered portion 126 toward the guide portion 123, that is, in the direction where the axle member 102 falls out of the escape wheel 101. In this manner, the axle member 102 is prevented from falling out of the escape wheel 101.

On the other hand, since the inclination angle θ2 in the axial direction of the guide portion 123 is smaller than the inclination angle θ1 in the axial direction of the tapered portion 126. Accordingly, when the axle member 102 is inserted into the escape wheel 101 from the tenon portion 121b side, the stress applied to the second portion 114b in the guide portion 123 gradually increases. In this manner, the second portion 114b gradually spreads outward in the radial direction. Therefore, the axle member 102 can be easily inserted into the escape wheel 101.

The inclination angle θ1 in the axial direction of the tapered portion 126 is preferably approximately 45°. If the inclination angle θ1 of the tapered portion 126 is approximately 45°, the stress acting outward in the radial direction and the stress acting toward the escape pinion portion 122 (tooth 124) side in the axial direction are applied from the tapered portion 126 to the holder 115 (second portion 114b) in a balanced manner.

As described above, the stress acting outward in the radial direction is applied to the second portion 114b. In this manner, the holder 115 can hold a state of being fitted into the recessed portion 127. The stress acting toward the escape pinion portion 122 side in the axial direction is applied to the second portion 114b. In this manner, the second portion 114b is pressed against the tooth 124 of the escape pinion portion 122. In this manner, the axle member 102 can be effectively prevented from falling out of the escape wheel 101. The second portion 114b is pressed against the tooth 124 of the escape pinion portion 122. In this manner, the escape wheel 101 can be held for the axle member 102 so that the front surface 101a and the rear surface 101b are orthogonal to the axis θ1.

If the inclination angle θ1 of the tapered portion 126 is small, the stress acting toward the escape pinion portion 122 side which is applied to the second portion 114b from the tapered portion 126 decreases. Accordingly, an advantageous effect is reduced in preventing the axle member 102 from falling out of the escape wheel 101. If the inclination angle θ1 of the tapered portion 126 is large, the axial length of the tapered portion 126 decreases. Accordingly, a width of variations which can be absorbed by the tapered portion 126 decreases.

Manufacturing Method of Escape Wheel & Pinion

Figure 10:
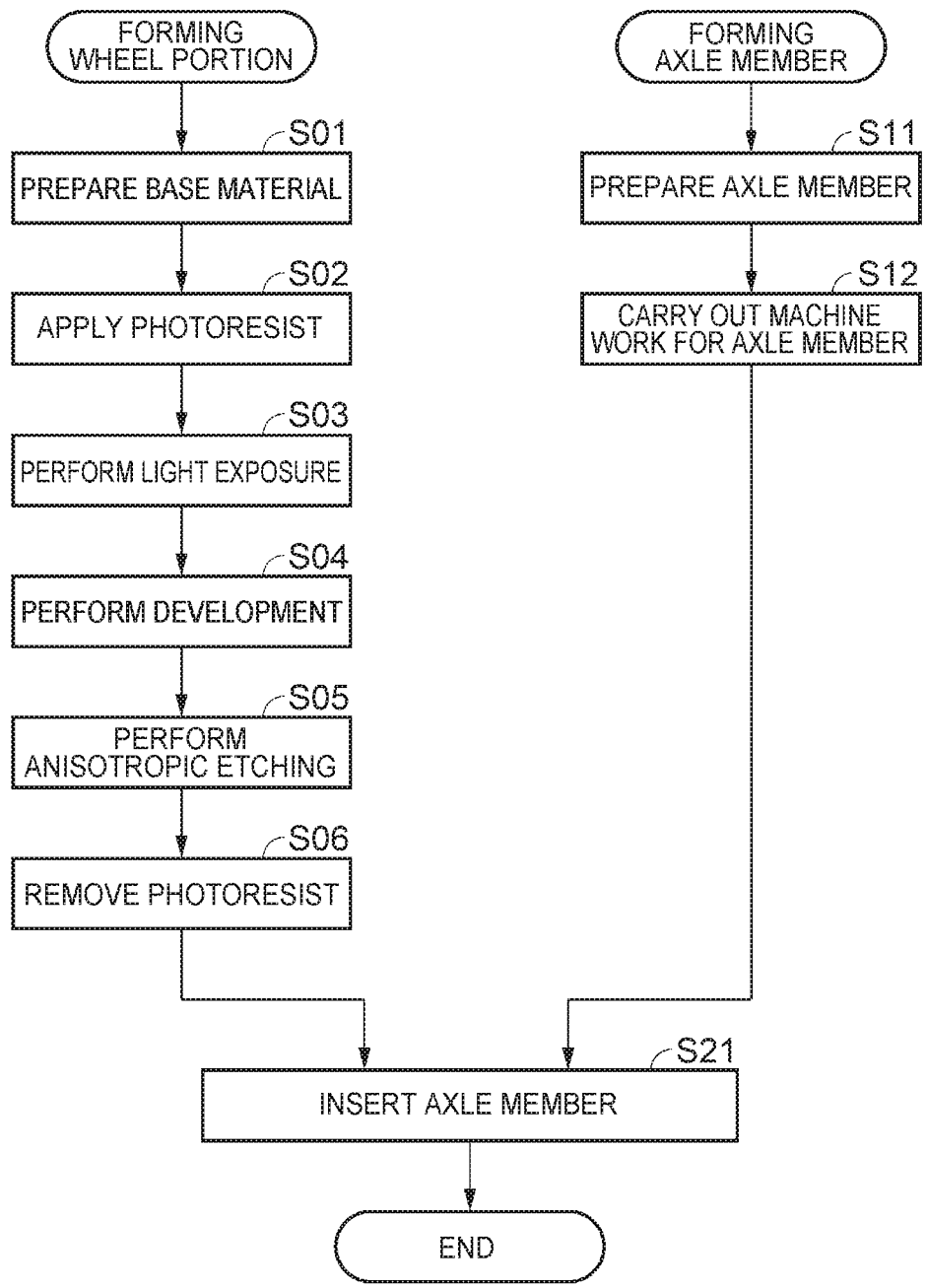
FIG. 10 is a flowchart illustrating a manufacturing method of the escape wheel & pinion according to the embodiment.

Next, a manufacturing method of the escape wheel & pinion 35 serving as the mechanical component according to the embodiment will be described. FIG. 10 is a flowchart illustrating the manufacturing method of the escape wheel & pinion according to the embodiment. As illustrated in FIG. 10, the manufacturing method of the escape wheel & pinion serving as the mechanical component according to the embodiment includes a step (first step) of forming the wheel (escape wheel 101) serving as the rotary member, a step (second step) of forming the axle member 102, and a step (third step) of inserting the axle member 102 into the escape wheel 101 so as to form the escape wheel & pinion 35.

The step of forming the escape wheel 101 as the first step is performed so as to form the holder 115 in the escape wheel 101, and includes Step S01 to Step S06. First, a wafer-shaped base material containing silicon is prepared (Step S01). Subsequently, a photoresist is applied to the front surface of the base material by means of spin coating or spray coating, for example (Step S02). The photoresist to be applied in Step S02 can employ either a negative type or a positive type material.

Subsequently, the photoresist applied onto the front surface of the base material is subjected to light exposure by using a photolithography technique (Step S03) and development is performed (Step S04). In this manner, a photoresist pattern serving as a mask (etching mask) corresponding to a planar outer shape of the escape wheel 101 illustrated in FIG. 6 is formed.

Subsequently, the photoresist pattern formed in Step S03 and Step S04 is used as the mask, and anisotropic etching such as deep reactive ion etching (DRIE) is performed on the base material (Step S05). In this manner, through the photoresist pattern, the base material is deeply dug from the front surface side in a substantially vertical direction. As illustrated in FIG. 6, an outer shape of the escape wheel 101 having the rim 111 having the plurality of the teeth 112, and the holder 115 having the first holder 113 and the second holder 114 is obtained.

Subsequently, the photoresist (photoresist pattern) is removed (Step S06 in FIG. 10). In Step S06, for example, the photoresist can be removed by means of wet etching using fuming nitric acid or organic solvent capable of dissolving and peeling off the photoresist, or by means of oxygen plasma asking. In this manner, the step of forming the escape wheel 101 is completed.

When the anisotropic etching is performed on the base material in Step S05, a mask may be formed so as to protect the rear surface of the base material from etching. Since the mask is formed on the rear surface of the base material, the base material is not etched from the rear surface side in Step S05. Accordingly, a shape of the side surface (surface along the axial direction) of the tooth 112 and the holder 115 is not changed. Therefore, it is possible to obtain a cross-sectional shape of the escape wheel 101 as illustrated in FIG. 4.

The silicon is used as the base material of the escape wheel 101. Accordingly, respective portions such as the first holder 113, the second holder 114, and the rim 111 of the escape wheel 101 can be formed using the same base material by performing the same etching step, and a plurality of the escape wheels 101 can be manufactured from the base material. Accordingly, it is possible to improve the productivity of the escape wheel 101 and to reduce the production cost. The escape wheel 101 is formed using the photolithography or etching technique. Therefore, the shape of respective portions can be formed into a desired shape, and the processing accuracy can be improved.

The step of forming the axle member 102 as the second step is performed so as to form the recessed portion 127 and the escape pinion portion 122 in the axle member 102, and includes Step S11 and Step S12 illustrated in FIG. 10. The step of forming the axle member 102 is performed separately from the step of forming the escape wheel 101 in Step S01 to Step S06.

First, a member serving as the axle member 102 is prepared (Step S11). The axle member 102 desirably has sufficient rigidity and heat resistance as an axle body. Carbon steel is a material which is excellent in rigidity and heat resistance as described above, and further, is a material which allows high workability in carrying out cutting work and grinding work. Accordingly, the carbon steel is particularly suitable as the material for the axle member 102. Tantalum (Ta) or tungsten (W) may be used as the material of the axle member 102.

Subsequently, machine work such as cutting work and the grinding work is carried out for the member serving as the axle member 102 (Step S12). For example, the recessed portion 127 having the tapered portion 126 is formed by carrying out the cutting work to cut one round in the circumferential direction between the guide portion 123 and the escape pinion portion 122 in the axial direction, inward (toward the center side of the axle member 102) from the front surface of the axle member 102. The tapered portion 126 is formed so that the diameter decreases as the tapered portion 126 is closer to the escape pinion portion 122 from the guide portion 123 side of the recessed portion 127.

Similarly, the guide portion 123 is formed so that the diameter decreases as the guide portion 123 is farther away from the recessed portion 127 toward the tenon portion 121b side. In this manner, as illustrated in FIG. 7, the axle member 102 having the tenon portions 121a and 121b, the escape pinion portion 122, the guide portion 123, the recessed portion 127, the tapered portion 126, and the groove 125 is obtained.

In the third step (Step S21), the axle member 102 is inserted into the escape wheel 101 so as to fit the holder 115 into the recessed portion 127. In Step S21, the escape wheel & pinion 35 is formed by inserting the axle member 102 formed in Step S11 and Step S12 into the escape wheel 101 formed in Step S01 to Step S06.

A procedure in which the axle member 102 is inserted into the escape wheel 101 in Step S21 will be described with reference to FIGS. 11 to 16. FIGS. 11 to 16 are schematic sectional views for describing the step of inserting the axle member into the escape wheel. FIGS. 11 to 16 correspond to partial sectional views obtained by enlarging a main portion in FIG. 4. In FIGS. 11 to 16, a case is illustrated as an example of pressing the escape wheel 101 into the axle member 102. However, the axle member 102 may be inserted and pressed into the escape wheel 101.

Figure 11:
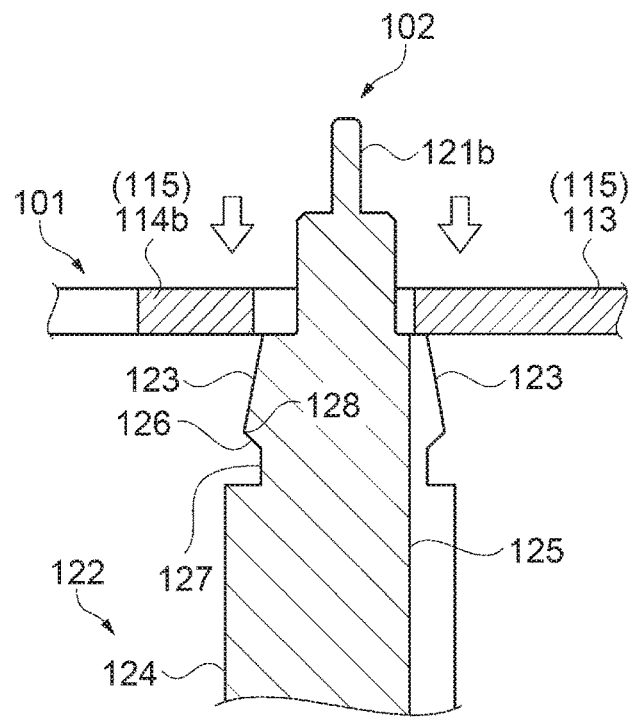
FIG. 11 is a schematic sectional view for describing a step of inserting the axle member into the escape wheel.

First, as illustrated in FIG. 11, the escape wheel 101 is disposed on the tenon portion 121b side of the axle member 102. More specifically, the escape wheel 101 is disposed for the axle member 102 so that the tenon portion 121b projects from the escape wheel 101 through the inside of the through-hole configured to include the holder 115 (the first holder 113 and the second portion 114b of the second holder 114). In this case, the axle member 102 and the escape wheel 101 are disposed so that the first holder 113 and the groove 125 are located at the same position in the circumferential direction of the axle member 102 and the second portion 114b and the guide portion 123 are located at the same position (refer to FIG. 2).

Figure 12:
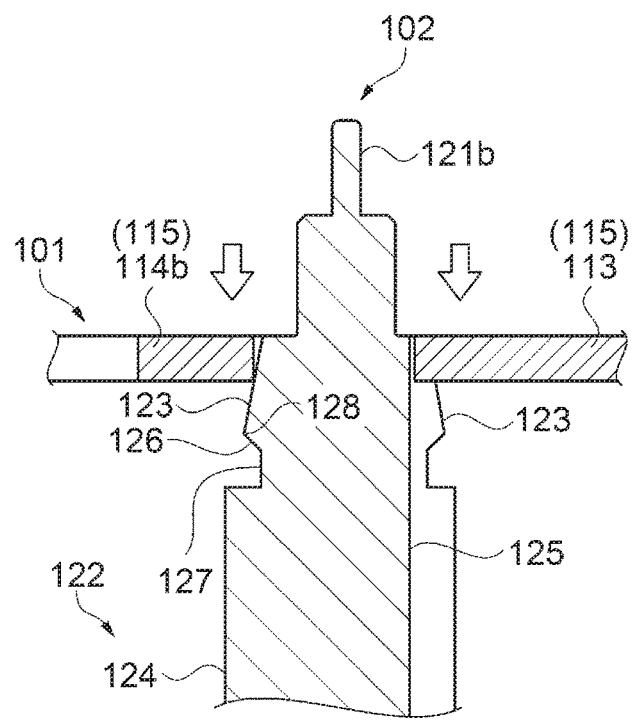
FIG. 12 is a schematic sectional view for describing a step of inserting the axle member into the escape wheel.

Subsequently, as illustrated in FIG. 12, the escape wheel 101 is pressed into the axle member 102 along the axial direction until the second portion 114b of the second holder 114 comes into contact with the guide portion 123. In this case, if the outer diameter D2 (refer to FIG. 8) of the axle member 102 in the end portion of the guide portion 123 on the tenon portion 121b side is equal to or smaller than the diameter D1 (refer to FIG. 6) of the inscribed circle 114c of the second portion 114b in a state where the axle member 102 is not inserted into the escape wheel 101, the end portion of the guide portion 123 on the tenon portion 121b side is easily inserted into the inscribed circle 114c of the second portion 114b.

On the other hand, the gap G exists between the first holder 113 and the groove 125 (refer to FIG. 5). Accordingly, if the escape wheel 101 is pressed into the axle member 102, the first holder 113 is easily fitted into the groove 125.

Figure 13:
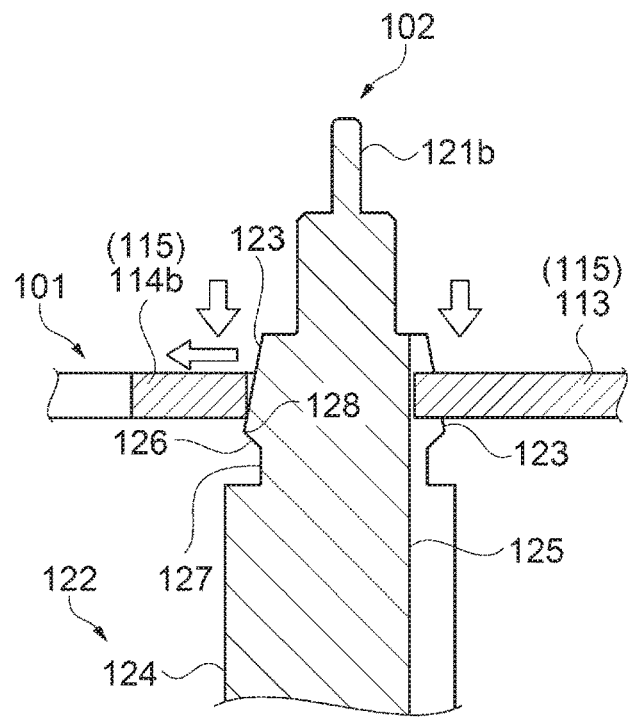
FIG. 13 is a schematic sectional view for describing a step of inserting the axle member into the escape wheel.

Subsequently, as illustrated in FIG. 13, the escape wheel 101 is further pressed into the axle member 102. The axle member 102 is formed so that the diameter of the axle member 102 increases as the guide portion 123 is closer to the recessed portion 127 (tapered portion 126) from the tenon portion 121b side. Accordingly, the second portion 114b gradually spreads outward in the radial direction.

Figure 14:
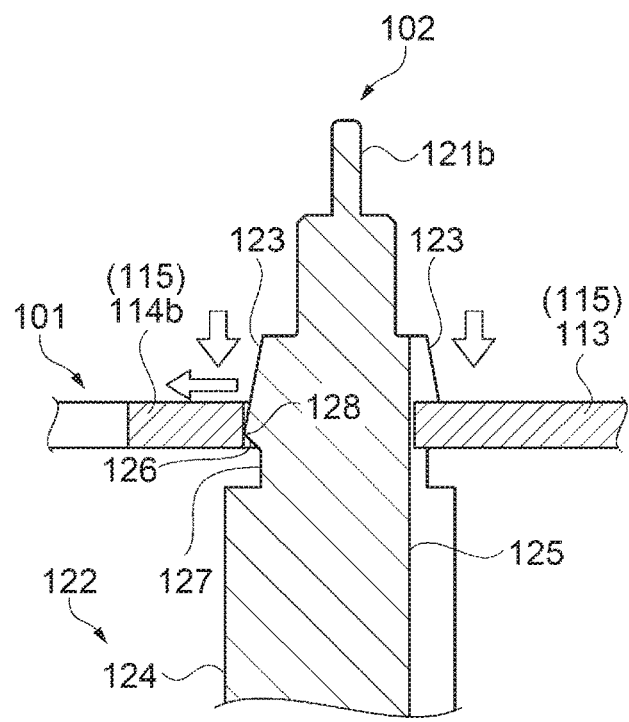
FIG. 14 is a schematic sectional view for describing a step of inserting the axle member into the escape wheel.

As illustrated in FIG. 14, if the second portion 114b reaches the boundary portion 128 between the guide portion 123 and the recessed portion 127 (tapered portion 126), the second portion 114b is brought into a state where the second portion 114b spreads outward most in the radial direction. In this case, the stress acting outward in the radial direction which is applied to the second portion 114b from the axle member 102 is maximized. The outer diameter D3 (refer to FIG. 8) of the axle member 102 in the boundary portion 128 is equal to or smaller than the maximum diameter D1max of the inscribed circle 114c of the second portion 114b. Accordingly, the second portion 114b can cross the boundary portion 128.

Figure 15:
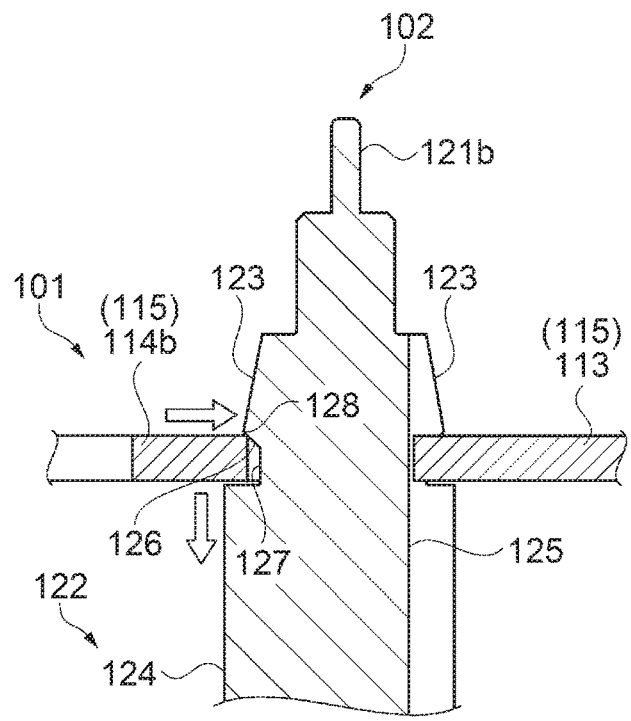
FIG. 15 is a schematic sectional view for describing a step of inserting the axle member into the escape wheel.

Subsequently, as illustrated in FIG. 15, if the second portion 114b crosses the boundary portion 128, the second portion 114b comes into contact with the tapered portion 126 disposed in the recessed portion 127 on the guide portion 123 side. The second portion 114b attempts to return inward in the radial direction in a state where the second portion 114b spreads outward most in the radial direction when passing through the boundary portion 128. In this case, the axle member 102 is formed so that the diameter of the axle member 102 decreases as the tapered portion 126 is closer to the tooth 124 (hereinafter, simply referred to as the tooth 124) of the escape pinion portion 122 from the guide portion 123. Accordingly, as the second portion 114b returns inward in the radial direction, the second portion 114b moves to the tooth 124 side.

Figure 16:
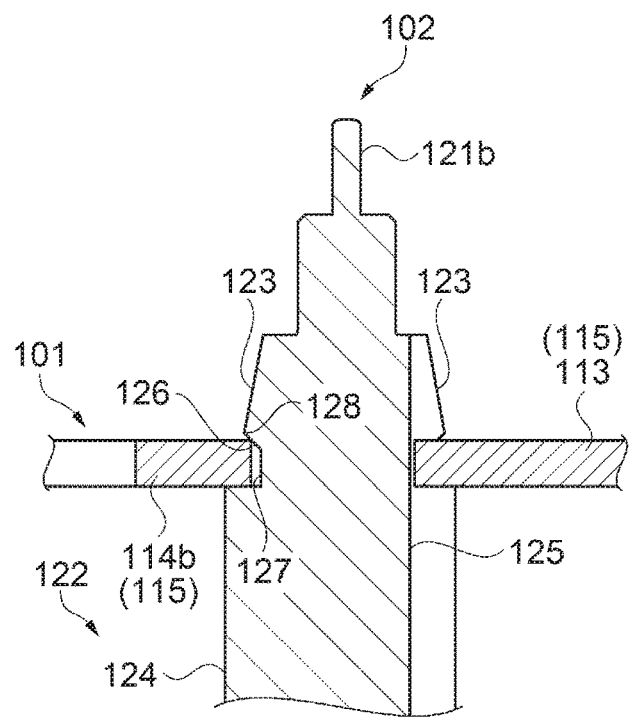
FIG. 16 is a schematic sectional view for describing a step of inserting the axle member into the escape wheel.

As a result, as illustrated in FIG. 16, the second portion 114b is fitted into the recessed portion 127 in a state of being in contact with the tooth 124. The diameter D1 (refer to FIG. 6) of the inscribed circle 114c of the second portion 114b of the escape wheel 101 formed in Step S01 to Step S06 is smaller than the outer diameter D4 (refer to FIG. 8) of the axle member 102 in the portion where the second portion 114b is in contact with the tapered portion 126 in a state where the axle member 102 is fitted into the recessed portion 127 in Step S21. Accordingly, even in a state where the axle member 102 is fitted into the recessed portion 127, the stress acting outward in the radial direction is applied to the second portion 114b.

The stress acting toward the tooth 124 side in the axial direction is applied from the tapered portion 126 to each of the plurality of second portions 114b disposed in the circumferential direction, thereby pressing the holder 115 against the tooth 124. In this manner, the escape wheel 101 can be held for the axle member 102 so that the front surface 101a and the rear surface 101b are orthogonal to the axis θ1 (refer to FIG. 4).

The diameter D5 (refer to FIG. 8) of the circumscribed circle of the tooth 124 is larger than the outer diameter D3 of the axle member 102 in the boundary portion 128, and is larger than the maximum diameter D1max of the inscribed circle 114c. Therefore, the tooth 124 regulates the position of the second portion 114b on the tenon portion 121a (refer to FIG. 4) side in the axial direction.

The outer diameter D3 of the axle member 102 in the boundary portion 128 is larger than the outer diameter D4 of the axle member 102 in the portion where the second portion 114b is in contact with the tapered portion 126 in a state where the holder 115 is fitted into the recessed portion 127. The stress acting toward the tooth 124 side in the axial direction is applied from the tapered portion 126 to the second portion 114b. Therefore, the holder 115 is prevented from moving to the tenon portion 121b side. In this manner, it is possible to prevent the escape wheel 101 from falling out of the axle member 102. In other words, it is possible to prevent the axle member 102 from falling out of the escape wheel 101.

On the other hand, in the process in which the escape wheel 101 is pressed into the axle member 102 illustrated in FIGS. 12 to 16, the first holder 113 has the gap G between the groove 125 and the groove 125, thereby maintaining the state of being fitted into the groove 125. A step difference is formed between the groove 125 and the recessed portion 127 in the circumferential direction. Accordingly, the escape wheel 101 can be prevented from being rotated with respect to the axle member 102.

Incidentally, in a case where the tapered portion 126 is not disposed in the recessed portion 127, if the axial length of the recessed portion 127 is shorter than the thickness of the second portion 114b, the second portion 114b does not enter the recessed portion 127. If the axial length of the recessed portion 127 is longer than the thickness of the second portion 114b, the second portion 114b and the recessed portion 127 are unsteadily fitted to each other. In a case where the tapered portion 126 is not disposed in the recessed portion 127, if the outer diameter of the axle member 102 in the recessed portion 127 varies, there is a possibility that the stress for fitting the second portion 114b into the recessed portion 127 may be insufficiently or excessively applied.

In the embodiment, the tapered portion 126 is disposed in the recessed portion 127. Accordingly, even in a case where the axial length of the recessed portion 127 varies, the second portion 114b is fitted into the recessed portion 127 after coming into contact with any position of the tapered portions 126. Therefore, without disposing the stress relaxation layer in the escape wheel 101, the holder 115 is reliably fitted into the recessed portion 127, thereby enabling the escape wheel 101 and the axle member 102 to be fixed to each other. In this manner, it is possible to prevent an increase in manufacturing man-hours of the escape wheel & pinion 35 and a poor manufacturing yield of the escape wheel & pinion 35.

Through the above-described steps, a series of manufacturing steps of the escape wheel & pinion 35 serving as the mechanical component is completed.

The above-described embodiment merely shows one aspect of the invention, and can be optionally modified and applied within the scope of the invention. For example, the following modification examples are conceivable.

Modification Example 1

In the above-described embodiment, a configuration is adopted in which the tapered portion 126 is disposed on the guide portion 123 side in the recessed portion 127. However, the invention is not limited thereto. The bottom portion of the recessed portion 127 may entirely be configured to include the tapered portion 126. According to this configuration, it is also possible to obtain an advantageous effect the same as that according to the above-described embodiment.

Modification Example 2

In the above-described embodiment, the number of the holders 115 (the first holder 113 and the second holder 114) belonging to the escape wheel 101 is configured to be the same as the number (seven in the above-described embodiment) of the teeth 124 of the escape pinion portion 122. However, the invention is not limited thereto. According to the configuration in which the number of the holders 115 is smaller than the number of the teeth 124 (that is, the number of the grooves 125) of the escape pinion portion 122, it is also possible to obtain the advantageous effect the same as that according to the above-described embodiment. However, in this case, it is assumed that the second portion 114b faces the guide portion 123 in the circumferential direction of the axle member 102 and the first holder 113 is disposed at a position where the first holder 113 can be fitted into the groove 125.

Modification Example 3

In the manufacturing method of the escape wheel & pinion according to the invention, after the axle member 102 is inserted into the escape wheel 101 in Step S21, oxidation treatment for forming a silicon oxide film made of silicon dioxide ($SiO_2$) may be performed on the front surface of the escape wheel 101. If the oxidation treatment is performed on the escape wheel 101, the mechanical strength of the escape wheel 101 is improved by the silicon oxide film formed on the front surface of the escape wheel 101 made of the material containing silicon. In a case where the oxidation treatment is performed, it is preferable that thermal oxidation treatment is performed at high temperature of 1,000° C. or higher, for example.

Modification Example 4

In the above-described embodiment, the escape wheel & pinion 35 has been described as an example of the mechanical component. However, the invention is not limited thereto. The configuration and the manufacturing method of the mechanical component according to the invention are also applicable to other mechanical components such as the movement barrel 22, the center wheel & pinion 25, the third wheel & pinion 26, the second wheel & pinion 27, the pallet fork 36, and the balance with hairspring 40. The configuration and the manufacturing method of the mechanical component according to the invention are also applicable to other mechanical components in which the axle member does not have the projection portion (escape pinion portion 122 in the escape wheel & pinion 35 according to the above-described embodiment).

The entire disclosure of Japanese Patent Application No. 2017-112337, filed Jun. 7, 2017 is expressly incorporated by reference herein.

What is claimed is:

1. A mechanical component for a timepiece comprising:
an axle that has a recess, the recess having a first tapered surface inclined with respect to an axial direction of the axle, the axle having a groove recessed inward of the recess in a plan view when viewed in the axial direction of the axle; and
a rotary member holding the axle at a position of the recess, the rotary member having:
a rim having a plurality of teeth;
a first holder extending from the rim toward the axle along a first direction, the first holder being fitted into the groove, the first holder having a tip that is located closer to a center side of the axle than a bottom of the recess when viewed in a cross-sectional direction of the axle; and
a second holder having a first member extending along a second direction intersecting the first direction, the second holder having a second member extending from the first member toward the axle along a third direction, the second member coming in contact with the first tapered surface of the recess.

2. The mechanical component for a timepiece according to claim 1,
wherein the first tapered surface is formed in a periphery of the axle around the axial direction of the axle, and a diameter of the first tapered surface decreases as the first tapered surface is closer from one end side to the other end side in the recess.

3. The mechanical component for a timepiece according to claim 2,
wherein the axle has a second tapered surface that is formed in the periphery of the axle around the axial direction of the axle, and the second tapered surface is located adjacent to the first tapered surface,
a diameter of the second tapered surface decreases as the second tapered surface is farther away from the recess, and
wherein an inclination angle of the first tapered surface with respect to the axial direction of the axle is larger than an inclination angle of the second tapered surface with respect to the axial direction of the axle.

4. The mechanical component for a timepiece according to claim 3,
wherein an outer diameter of the axle at a boundary between the recess and the second tapered surface is larger than an outer diameter of the axle at a position where the second member of the second holder comes in contact with the first tapered surface.

5. The mechanical component for a timepiece according to claim 2,
wherein the axle has a projection that comes in contact with the second member of the second holder on the other end side of the recess.

6. The mechanical component for a timepiece according to claim 1,
wherein the second holder has a plurality of the first members.

7. A timepiece comprising:
an axle that has a recess, the recess having a first tapered surface inclined with respect to an axial direction of the axle, the axle having a groove recessed inward of the recess in a plan view when viewed in the axial direction of the axle;
a rotary member holding the axle at a position of the recess, the rotary member having:
a rim having a plurality of teeth;
a first holder extending from the rim toward the axle along a first direction, the first holder being fitted into the groove, the first holder having a tip that is located closer to a center side of the axle than a bottom of the recess when viewed in a cross-sectional direction of the axle; and
a second holder having a first member extending along a second direction intersecting the first direction, the second holder having a second member extending from the first member toward the axle along a third direction, the second member coming in contact with the first tapered surface of the recess; and
a movement barrel operatively associated with the axle and the rotary member.

8. The timepiece according to claim 7,
wherein the first tapered surface is formed in a periphery of the axle around the axial direction of the axle, and a diameter of the first tapered surface decreases as the first tapered surface is closer from one end side to the other end side in the recess.

9. The timepiece according to claim 8,
wherein the axle has a second tapered surface that is formed in the periphery of the axle around the axial direction of the axle, and the second tapered surface is located adjacent to the first tapered surface, a diameter of the second tapered surface decreases as the second tapered surface is farther away from the recess, and wherein an inclination angle of the first tapered surface with respect to the axial direction of the axle is larger than an inclination angle of the second tapered surface with respect to the axial direction of the axle.

10. The timepiece according to claim 9, wherein an outer diameter of the axle at a boundary between the recess and the second tapered surface is larger than an outer diameter of the axle at a position where the second member of the second holder comes in contact with the first tapered surface.

11. The timepiece according to claim 8, wherein the axle has a projection that comes in contact with the second member of the second holder on the other end side of the recess.

12. The timepiece according to claim 7, wherein the second holder has a plurality of the first members.

13. A manufacturing method of a mechanical component for a timepiece, the method comprising:

form an axle;

forming a recess in the axle, the recess having a first tapered surface inclined with respect to an axial direction of the axle;

forming a groove in the axle, the groove being recessed inward of the recess in a plan view when viewed in the axial direction of the axle;

forming a rotary member holding the axle at a position of the recess, the rotary member having, a rim having a plurality of teeth;

a first holder extending from the rim toward the axle along a first direction, the first holder being fitted into the groove, the first holder having a tip that is located closer to a center side of the axle than a bottom of the recess when viewed in a cross-sectional direction of the axle; and a second holder having a first member extending along a second direction intersecting the first direction, the second holder having a second member extending from the first member toward the axle along a third direction, the second member coming in contact with the first tapered surface of the recess inserting the axle into the rotary member along the axial direction of the axle so that the first holder is fitted into the groove and second member of the second holder is fitted into the recess, wherein the first tapered surface is formed in a periphery of the axle around the axial direction of the axle, and a diameter of the first tapered surface decreases as the first tapered surface is closer from one end side to the other end side in the recess, wherein the first holder is configured with a plurality of the first holders and the recess is configured with a plurality of the recesses that are formed in a periphery of the axle, and an inner diameter of a virtual circle connecting inner lips of the first holders is smaller than an outer diameter of a virtual circle connecting the bottoms of the recesses around the axle.

14. The manufacturing method according to claim 13, wherein in the forming the recess, a second tapered surface is formed in the periphery of the axle around the axial direction of the axle, and the second tapered surface is located adjacent to the first tapered surface, a diameter of the second tapered surface decreases as the second tapered surface is farther away from the recess, and wherein an outer diameter of the axle at a boundary between the recess and the second tapered surface is larger than an outer diameter of the axle at a position where the second member of the second holder comes in contact with the first tapered surface.

15. The mechanical component for a timepiece according to claim 1, wherein, when the first holder is fitted into the groove, an inner tip of the first holder is spaced apart from the groove of the axle by a gap.

16. The mechanical component for a timepiece according to claim 1, wherein the rotary member contains silicon.

17. The timepiece according to claim 7, wherein the rotary member contains silicon.

* * * * *